(12) United States Patent
Nakagawa et al.

(10) Patent No.: US 8,643,230 B2
(45) Date of Patent: Feb. 4, 2014

(54) LINEAR ACTUATOR AND METHOD OF MANUFACTURING LINEAR ACTUATOR INCLUDING A DEAERATING STEP

(75) Inventors: Hiroshi Nakagawa, Ise (JP); Takayoshi Fujii, Ise (JP); Takashi Fukunaga, Ise (JP); Takashi Onoue, Ise (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 36 days.

(21) Appl. No.: 13/295,318

(22) Filed: Nov. 14, 2011

(65) Prior Publication Data

US 2012/0062047 A1  Mar. 15, 2012

Related U.S. Application Data

(63) Continuation of application No. PCT/JP2009/070523, filed on Dec. 8, 2009.

(30) Foreign Application Priority Data

May 14, 2009 (JP) ................................. 2009-118072
May 14, 2009 (JP) ................................. 2009-118073
Jun. 30, 2009 (JP) ..................... PCT/JP2009/061957

(51) Int. Cl.
*H02K 33/00* (2006.01)
*H02K 9/00* (2006.01)
*H02K 9/08* (2006.01)

(52) U.S. Cl.
USPC ................... 310/16; 310/17; 310/56; 310/57

(58) Field of Classification Search
USPC .......................................... 310/15, 16, 56, 57
See application file for complete search history.

(56) References Cited

U.S. PATENT DOCUMENTS

| | | | |
|---|---|---|---|
| 4,955,361 A * | 9/1990 | Sotani et al. ................ | 126/351.1 |
| 5,360,445 A * | 11/1994 | Goldowsky .................. | 623/3.22 |
| 6,118,360 A | 9/2000 | Neff | |
| 2004/0164623 A1 | 8/2004 | Suzuki et al. | |
| 2005/0000092 A1 | 1/2005 | Misu et al. | |

(Continued)

FOREIGN PATENT DOCUMENTS

| | | |
|---|---|---|
| CN | 1559102 | 12/2004 |
| JP | 47-4529 | 2/1972 |

(Continued)

OTHER PUBLICATIONS

Machine Translation JP2008182869(2008).*

(Continued)

*Primary Examiner* — Tran Nguyen
*Assistant Examiner* — Jose Gonzalez Quinones
(74) *Attorney, Agent, or Firm* — Oblon, Spivak, McClelland, Maier & Neustadt, L.L.P.

(57) ABSTRACT

A linear actuator includes a linear actuator body (2), a casing (3) for housing the linear actuator body (2), and insulating oil (L) that fills the casing (3) with a coil (44) of the linear actuator body (2) submerged therein. In such a configuration, heat generated by the coil (44) is quickly released to the oil (L) and is then conducted to the casing (3). The oil (L) fully spreads into gaps in the coil (44), of course. Therefore, heat is released very efficiently. Thus, by improving the heat-releasing characteristic, a linear actuator having a reduced size and a reduced weight is provided.

17 Claims, 16 Drawing Sheets

(56) References Cited

U.S. PATENT DOCUMENTS

| | | |
|---|---|---|
| 2005/0001491 A1 | 1/2005 | Fujiwara et al. |
| 2005/0095159 A1 | 5/2005 | Sumi et al. |
| 2005/0183906 A1 | 8/2005 | Misu et al. |
| 2008/0274897 A1* | 11/2008 | Wiezoreck et al. ........... 505/166 |
| 2010/0127442 A1 | 5/2010 | Muragishi et al. |
| 2011/0198945 A1 | 8/2011 | Nakagawa et al. |

FOREIGN PATENT DOCUMENTS

| | | |
|---|---|---|
| JP | 60-113840 | 6/1985 |
| JP | 60-172005 U1 | 11/1985 |
| JP | 63-087150 | 4/1988 |
| JP | 08-033280 | 2/1996 |
| JP | 08-261393 | 10/1996 |
| JP | 2000-270533 | 9/2000 |
| JP | 2001-082473 | 3/2001 |
| JP | 2002-213452 | 7/2002 |
| JP | 2004-007871 A | 1/2004 |
| JP | 2004-260950 A | 9/2004 |
| JP | 2004-343964 | 12/2004 |
| JP | 2005-36974 | 2/2005 |
| JP | 2005-114051 | 4/2005 |
| JP | 2005-273908 | 10/2005 |
| JP | 2006-162024 | 6/2006 |
| JP | 2007-295710 A | 11/2007 |
| JP | 2008-008313 | 1/2008 |
| JP | 2008-111507 | 5/2008 |
| JP | 2008-172939 A | 7/2008 |
| JP | 2008-182869 | 8/2008 |
| JP | 2008182869 A * | 8/2008 |
| JP | 2008-256109 | 10/2008 |
| JP | 2008-256110 | 10/2008 |

OTHER PUBLICATIONS

U.S. Appl. No. 13/091,780, filed Apr. 21, 2011, Nakagawa, et al.
Chinese Office Action date Mar. 27, 2013 issued in Chinese Appln. No. 200980159303.5.
International Search Report dated Mar. 16, 2010 issued in PCT/JP2009/070523.
International Search Report dated Sep. 8, 2009 issued in PCT/JP2009/061957.
Explanation of circumstances concerning accelerated examination filed to the JPO in the corresponding JP Appln. No. 2009-118073.

* cited by examiner

FIG. 5
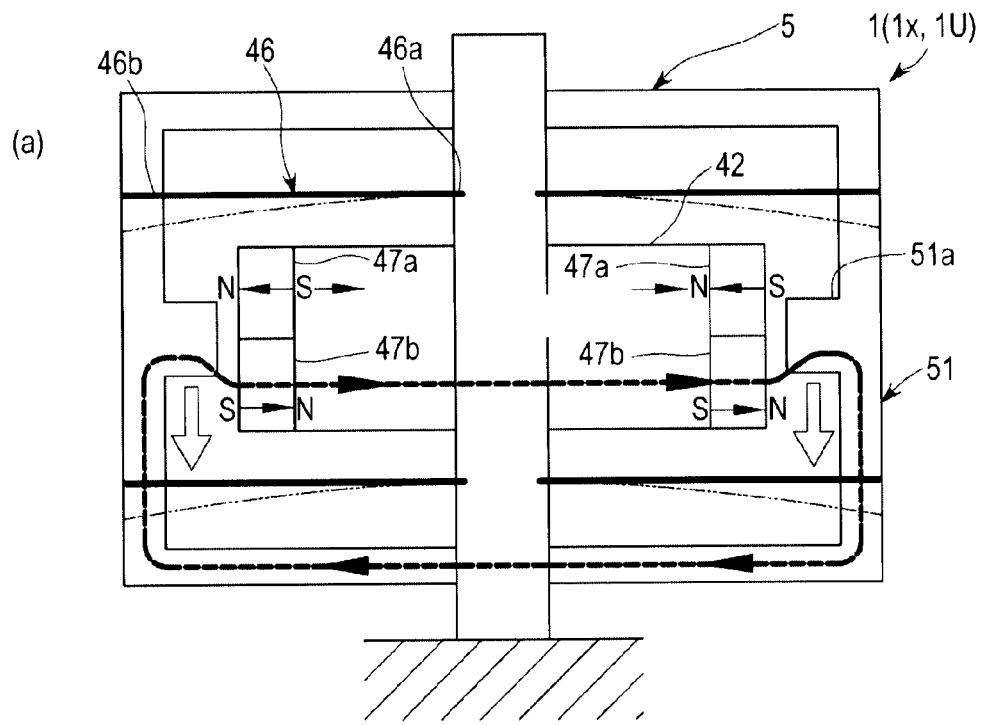
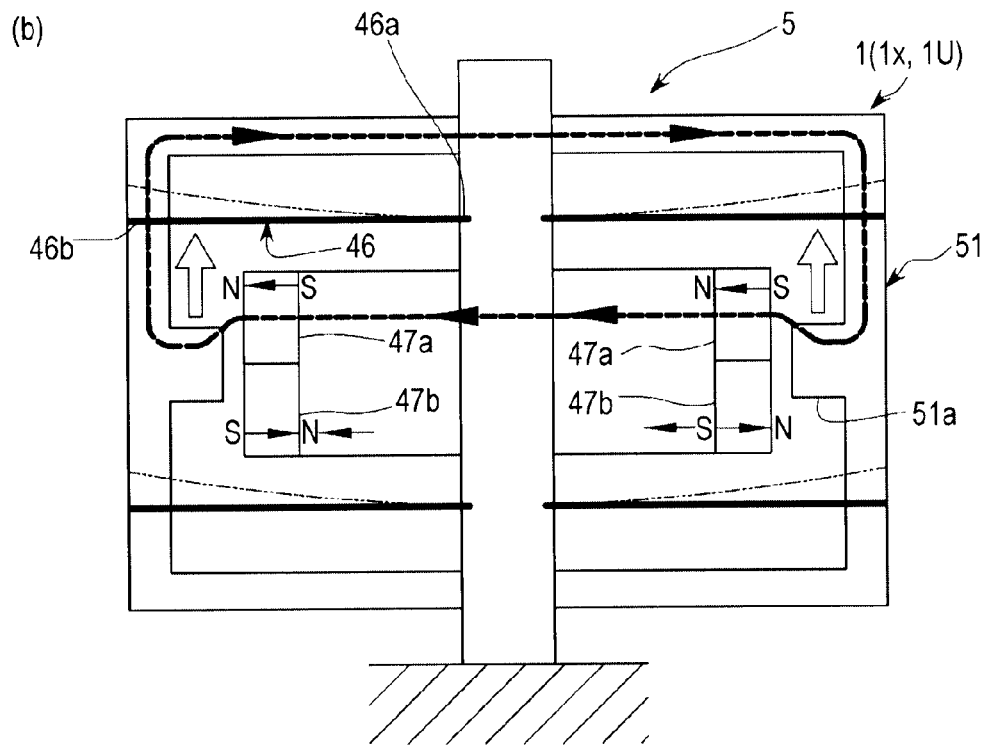

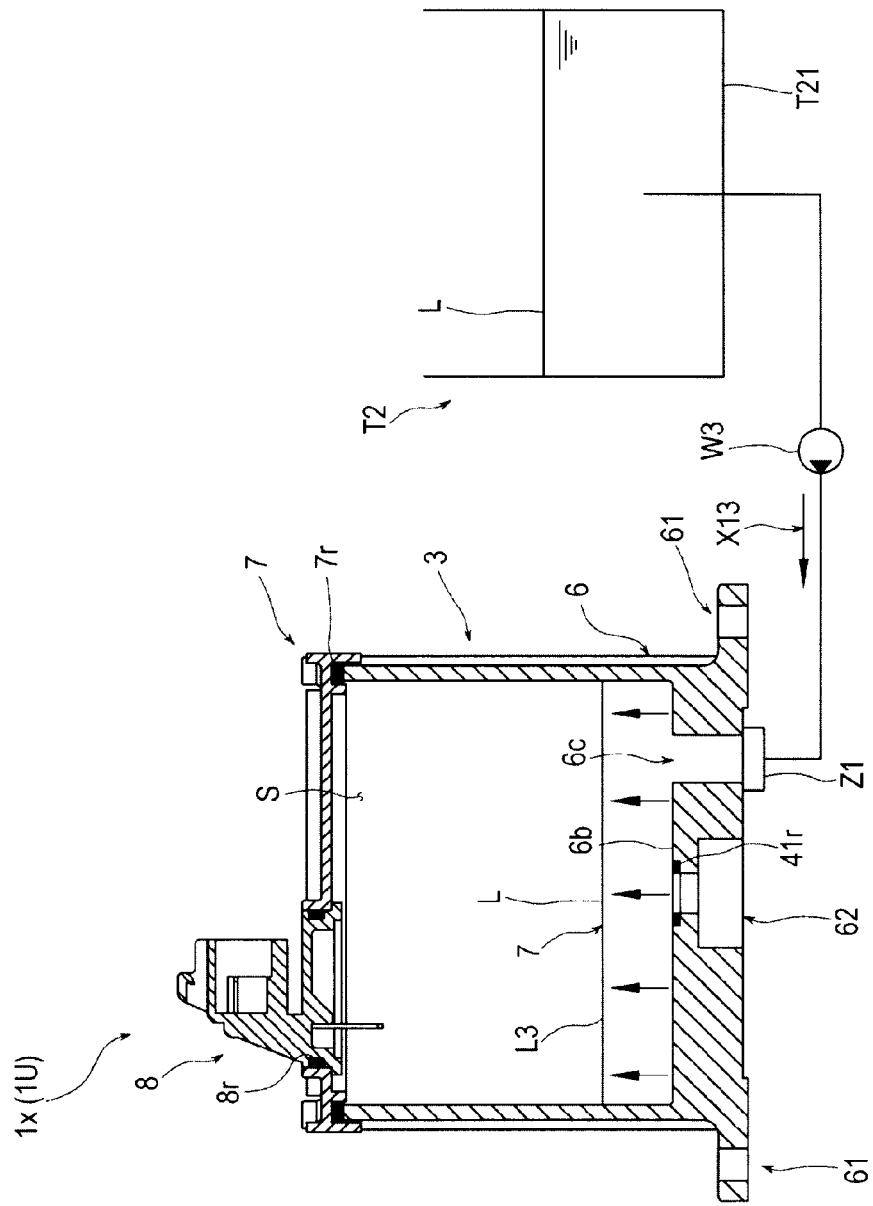

LINEAR ACTUATOR AND METHOD OF MANUFACTURING LINEAR ACTUATOR INCLUDING A DEAERATING STEP

CROSS REFERENCE TO RELATED APPLICATION

This application is a continuation application of International Application No. PCT/JP2009/070523, filed Dec. 8, 2009, the entire contents of which are incorporated herein by reference. PCT/JP2009/070523 claims priority to JP 2009-118072, filed May 14, 2009, JP 2009-118073, filed May 14, 2009 and PCT/JP2009/061957, filed Jun. 30, 2009.

BACKGROUND OF THE INVENTION

The present invention relates to a linear actuator and a method of manufacturing a linear actuator unit.

BACKGROUND ART

Hitherto, a linear actuator that reciprocates a mover relative to a stator is employed in different applications such as a compressor.

At present, in view of environmental issues, the automobile industry is promoting the improvement of fuel economy. To improve fuel economy, developments are in progress in different aspects, for example, weight reduction in the vehicle body, reduction of engine speed during idling, expansion of lock-up area, cylinder-deactivation engines, clean diesel engines, and lean-burn technology. It is known, however, that all of such measures increase the vibration of the vehicle body. To avoid the increase of such vibration, there is a review of an active mass damper, i.e., a vibration-damping device, in which a linear actuator drives a weight and, with the reaction force accompanying the driving, the vibration of a vehicle body is suppressed by producing a vibration whose phase is opposite to that of the vibration of the vehicle body (see PTL 1, for example). Basically, actuators intended for active mass dampers are often provided in engine rooms. Therefore, such actuators are desired to be extremely reliable even in harsh environments under severe temperature conditions and so forth and are required to be small and light.

Meanwhile, there have been disclosed other techniques of improving the performance of such linear actuators: for example, a technique in which a stator and a mover are supported by leaf springs so that the relative positions of the stator and the mover can be retained with high accuracy even after long hours of operation (see PTL 2, for example).

CITATION LIST

Patent Literature

PTL 1: Japanese Unexamined Patent Application Publication No. 2006-162024
PTL 2: Japanese Unexamined Patent Application Publication No. 2004-343964

SUMMARY OF INVENTION

Technical Problem

In the vibration-damping device disclosed in PTL 1, however, in which the linear actuator is housed in a casing, heat generated by a coil is released along paths most of which run from the coil through a coil bobbin and a stator core to a shaft, further run through specific points of the casing at which the shaft is secured, and reach the vehicle body. That is, heat generated by the coil is basically conducted only along paths on the linear actuator itself and is therefore easy to accumulate, resulting in a problem that the linear actuator included in the vibration-damping device is naturally liable to have a high thermal resistance with respect to the casing. This means that, practically, the linear actuator is always operated with the coil thereof being at a high temperature and therefore has a small capacity, i.e., rated thrust, relative to the size of its motor. In other words, to realize a required thrust, a linear actuator having a larger rated thrust needs to be employed, unavoidably resulting in an increase in the size of the device.

To improve reliability by appropriately maintaining the accuracy in supporting the mover with respect to the stator, such a vibration-damping device may include leaf springs, as in the case of PTL 2. With the leaf springs that are elastically deformable, the mover is reciprocatably supported by the stator. Such a case, however, requires anti-fretting measures so as to provide stable performance over a long period of time and to provide a long life. The term fretting herein refers to a phenomenon of repeated minute relative slipping occurring between objects that are in contact with each other under a certain pressure and accompanied by a frictional force. A fatigue phenomenon occurring on materials in portions where fretting occurs, specifically, at and near positions where the leaf springs are attached, is called fretting fatigue. To expand the range of stroke motion and to provide sufficient radial rigidity, the leaf springs each may include a plurality of thin plates stacked one on top of another. As the fretting measures, for example, copper-plate spacers softer than the leaf springs or anti-fretting grease is provided at portions where the leaf springs are overlaid. Such measures are far from sufficient, with problems that the grease evaporates and that the configuration becomes complicated with the addition of the copper-plate spacers.

Moreover, since the vibration-damping device is basically provided in the engine room as described above, consideration for severe environmental conditions is necessary. Therefore, measures against the above problems particularly need to be taken.

The present invention is focused on such problems and to newly provide a linear actuator that is applicable to devices such as a vibration-damping device and a vibration-applying device and whose size, weight, and the like are effectively reduced by improving its heat-releasing characteristics, and a method of manufacturing a linear actuator unit including the same as a unit.

Solution to Problem

To achieve the above object, the present invention employs the following solutions.

Specifically, a linear actuator according to the present invention includes a linear actuator body including a stator and a mover that is reciprocatable in a specific direction relative to the stator, a casing substantially enclosing the linear actuator body with part of the linear actuator body secured thereto, and insulating and lubricating liquid material that fills an internal space of the casing with a coil of the linear actuator body submerged therein.

In such a configuration, heat generated by the coil is quickly released to the liquid material and is then conducted to the casing. Specifically, since the liquid material fully spreads into gaps in the coil, of course, heat is released very efficiently and the thermal resistance between the actuator body and the casing is significantly reduced, compared with that in the known art. Furthermore, the liquid material is constantly agitated by the movement of the mover. Therefore, good thermal conductivity is provided, and the heat conducted to the liquid material is released to the outside of the casing not only from the contact points between the casing and the vehicle body but also from other outer surfaces. Thus, since the rise of temperature due to heat generation by the coil is effectively suppressed, the thermal time constant becomes long and the reductions in the rated thrust and instantaneous maximum thrust of the linear actuator itself due to heat generation by the coil are significantly suppressed. Consequently, desired rated thrust and instantaneous maximum thrust are realized even if the size of the linear actuator body is reduced. Correspondingly, the size and weight of a device as a whole, such as a vibration-damping device or a vibration-applying device to which the present invention is applied, can be reduced. Of course, applications of the linear actuator are not limited to a vibration-damping device and a vibration-applying device.

Specific modes in which vibration of an object of vibration damping is effectively suppressed by using the above linear actuator include a mode in which part of the stator is secured to the casing, part of the casing is secured to the object of vibration damping, and a reaction force produced when the mover moves is transmitted to the object of vibration damping through the stator and the casing.

To improve reliability by simply and appropriately maintaining the accuracy in supporting the mover with respect to the stator, it is desirable that the linear actuator further include a movable supporting portion, such as a leaf spring or a sliding bearing, that allows, by undergoing elastic deformation, the stator to support the mover such that the mover is reciprocatable, and that the liquid material fills the internal space such that the movable supporting portion is submerged therein. This means that, in such a configuration, the above fretting measures to be taken in a case where the movable supporting portion is employed in the vibration-damping device to be mounted on a vehicle is naturally realized. That is, since a region where the movable supporting portion is attached and a peripheral region thereof are filled with the liquid material as described above, problems of evaporation of grease or configurational complexity with the insertion of copper-plate spacers are avoided and the above friction, i.e., fretting, is effectively avoided. In addition, according to the present application, since the space is filled with the liquid material having a higher viscosity than air, the movable supporting portion is damped and the behavior of the movable supporting portion is stabilized. Thus, a very smooth operation is realized, contributing to noise reduction.

To reduce the thickness of the casing and to further improve the heat-releasing characteristic, it is desirable that the liquid material fill 80 to 95% of the internal space. That is, by filling 80 to 95% capacity of the internal space, which is fully filled with air in the known art, defined between the casing and the linear actuator body with the liquid material, the volume of air in the internal space of the casing is significantly reduced. Correspondingly, the amount of expansion/contraction of air caused by the rise of temperature is significantly reduced. Consequently, even if the casing is not a completely sealable container, the amount of moisture in the air is reduced and deterioration of the liquid material, such as oil, due to oxidation caused by the moisture is reduced, leading to an extension of the life of the liquid material.

Furthermore, if the casing is a breathable container, a problem of internal pressure is solved. Consequently, the thickness of the casing is reduced and the number of selectable sealing materials is increased, whereby costs are reduced. In addition, in conjunction with the agitation of the liquid material caused by the movement of the mover, the liquid material is in contact with almost the entirety of the inner surface of the casing and therefore releases heat from almost the entirety of the surface of the casing.

In such a linear actuator, it is particularly effective in providing a good heat-releasing characteristic that a linear actuator body including a stator and a mover that is reciprocatable in a specific direction relative to the stator is housed in a casing in such a manner as to be enclosed by the casing with part of the linear actuator body secured to the casing, the casing is filled with insulating and lubricating liquid material before or after the linear actuator body is housed and such that a coil of the linear actuator body is submerged in the liquid material, and bubble removal for avoiding the formation of bubbles between the linear actuator body and the liquid material is performed on the liquid material before or after the completion of the filling.

Meanwhile, a method of manufacturing a linear actuator unit according to the present invention is to appropriately provide the above linear actuator as a unit and to newly provide a linear actuator unit including a linear actuator body including a stator and a mover that is reciprocatable in a specific direction relative to the stator, a casing substantially enclosing the linear actuator body with part of the linear actuator body secured thereto, and insulating and lubricating liquid material that fills an internal space of the casing with a coil of the linear actuator body submerged therein. To appropriately provide such a linear actuator, the manufacturing method according to the present invention includes a housing step of housing the linear actuator body into the casing, a filling step of filling the casing that houses the linear actuator body with the liquid material, and a bubble-removing step of avoiding the formation of bubbles between the linear actuator body and the liquid material.

That is, in the configuration included in the linear actuator, if any bubbles adhere to the linear actuator body, heat is not released where the bubbles adhere and the temperature rises locally. Consequently, a problem arises in that the reductions in the rated thrust and instantaneous maximum thrust of the linear actuator itself are not suppressed. In this respect, the manufacturing method according to the present invention employs the bubble-removing step of avoiding the formation of bubbles between the linear actuator body and the liquid material during the manufacturing process. Thus, even unrecognizable failure in supplying the liquid material is also solved, and desired effects are assuredly realized. Of course, the method of manufacturing a linear actuator unit is not limited to be applied to a linear actuator intended for a vibration-damping device or a vibration-applying device.

Particularly, in a case where the linear actuator unit further includes a movable supporting portion, such as a leaf spring or a sliding bearing, that allows, by undergoing elastic deformation, the stator to support the mover such that the mover is reciprocatable so that reliability is improved by simply and appropriately maintaining the accuracy in supporting the mover with respect to the stator, it is desirable as one condition that the liquid material fill the internal space such that the movable supporting portion is submerged therein. That is, in the linear actuator unit having the above configuration, since a region where the movable supporting portion is attached and a peripheral region thereof are filled with the liquid material as described above, problems of evaporation of grease or configurational complexity with the insertion of copper-plate spacers are avoided and the above friction, i.e., fretting, is effectively avoided. In addition, according to the present application, since the space is filled with the liquid material having a higher viscosity than air, the movable supporting portion is damped and the behavior of the movable supporting portion is stabilized. Thus, a very smooth operation is realized, contributing to noise reduction. Nevertheless, in the case where the linear actuator unit employs such a configuration, once any bubbles adhere to the movable supporting portion, the bubbles remain adhered with surface tension or the like even during the operation. This may cause local wear at portions having the bubbles where the above effects are not exerted, or frictional heat concentrates on such portions, failing in achieving the desired object. In contrast, the present invention includes the bubble-removing step in which any bubbles formed between the movable supporting portion and the liquid material are proactively removed. Furthermore, the region around the movable supporting portion is tightly filled with the liquid material. Therefore, the occurrence of failure in supplying the liquid material accompanied by adhesion of bubbles occurring at portions where bubbles are not removable during the operation is appropriately prevented.

The bubble-removing step according to the present invention includes any step in which any bubbles in the liquid material can be removed during the manufacturing of the linear actuator unit. Specific modes of such a step include the following.

In one mode, the bubble-removing step includes a during-filling deaerating step in which the bubbles are removed before the completion of the filling step. Specifically, the during-filling deaerating step includes both concepts of a deaerating step performed before the filling step and a deaerating step performed during the filling step. First, a during-transfer deaerating step can be named in which the liquid material yet to be supplied into the casing is deaerated in advance. In this mode, since air dissolved in the liquid material is removed in advance, it is effectively avoided that bubbles are newly formed from air later dissolved during or after the process of completing the linear actuator unit through relevant steps subsequent to the filling step. The during-transfer deaerating step includes, for example, a mode of eliminating the chance of bubble formation in advance in which, in the filling step, a discharge nozzle that discharges the liquid material is placed in contact with the inner wall of the casing in advance and the liquid material is supplied in such a manner as to run down along the inner wall.

Meanwhile, as a mode of later removing bubbles having adhered to the linear actuator body, it is desirable that the bubble-removing step include a post-filling deaerating step of separating the bubbles formed between the liquid material having been supplied in the filling step and the linear actuator body from the linear actuator body. Specifically, in a case where the internal space of the casing is substantially full of the liquid material and is thus made liquid-tight in the filling step, there can be named a mode of performing the post-filling deaerating step as an in-casing deaerating step in which the liquid material making the casing liquid-tight is deaerated. In this mode, not only bubbles adhering to the linear actuator body but also air dissolved in the liquid material are removed. Therefore, the occurrence of residual bubbles or newly formed bubbles after the completion of the linear actuator unit according to the present invention is effectively avoided. As other modes of removing bubbles after the filling step, the following can be named: a moving step in which bubbles formed in the filling step are separated from the linear actuator body by moving the mover of the linear actuator body, and a shaking step in which bubbles are separated from the linear actuator body by shaking the casing as a whole. The concept of "shaking" herein is not limited to shaking realized by, for example, simply moving or tilting the casing and includes proactively moving the casing with, for example, a vibration source or the like. The vibration source in this case may be the linear actuator body housed in the casing.

The bubble-removing step according to the present invention does not deny performing a selected one of the above steps. Nevertheless, by employing a plurality or all of the above steps, the effects are multiplied and assured removal of bubbles and prevention of new bubble formation are realized with high reliability.

Advantageous Effects of Invention

In the linear actuator according to the present invention, heat generated by the coil is quickly released to the liquid material and is efficiently conducted to the casing with agitation by the mover. Therefore, the thermal resistance between the actuator body and the casing is significantly reduced, compared with that in the known art. Furthermore, the heat conducted to the liquid material is released to the outside of the casing not only from the contact points between the casing and the vehicle body but also from other outer surfaces. Thus, the rise of temperature due to heat generation by the coil is effectively suppressed, and the problem of reductions in the rated thrust and instantaneous maximum thrust of the linear actuator itself is effectively avoided. Consequently, even if the size of the linear actuator body is reduced, the linear actuator can be provided with desired rated thrust and instantaneous maximum thrust.

In the method of manufacturing a linear actuator unit according to the present invention, the bubble-removing step effectively avoids the adhesion of bubbles to the linear actuator body. This effectively solves the failure in reducing the rated thrust and instantaneous maximum thrust of the linear actuator itself occurring because heat is not released at points where bubbles adhere and the temperature is raised locally. Thus, a high-performance linear actuator unit having an excellent heat-releasing characteristic despite its smallness and lightness can be effectively manufactured.

BRIEF DESCRIPTION OF DRAWINGS

FIG. 5 includes diagrams illustrating the operation of the linear actuator unit.

FIG. 16 is a diagram illustrating a fourth embodiment of the present invention.

DESCRIPTION OF EMBODIMENTS

Embodiments of the present invention will now be described with reference to the drawings.

First Embodiment

Figure 1:
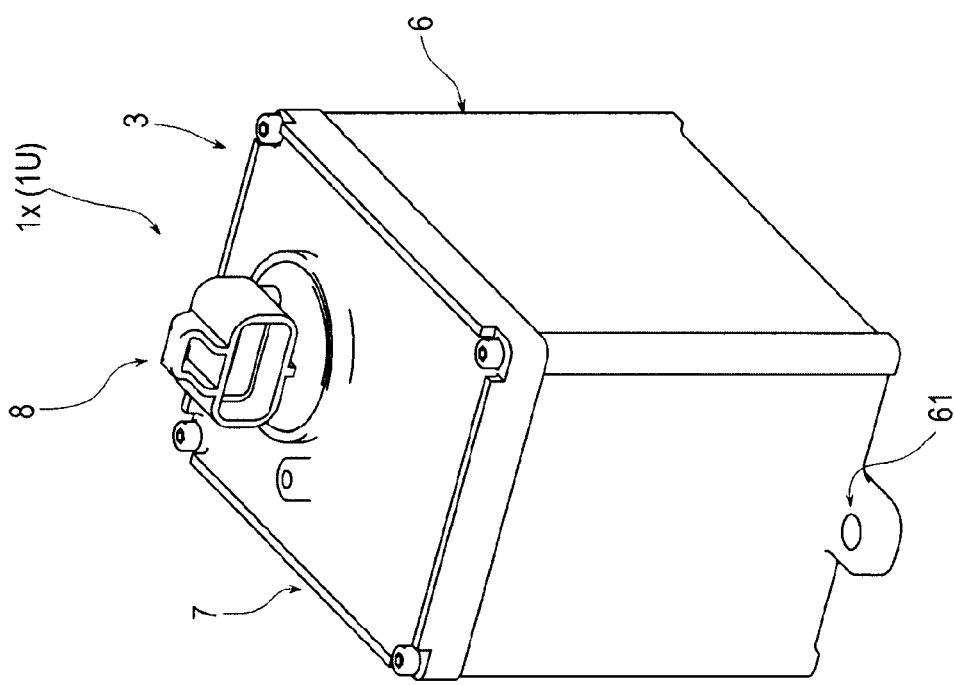
FIG. 1 is a perspective view of a linear actuator unit according to an embodiment of the present invention.
Figure 2:
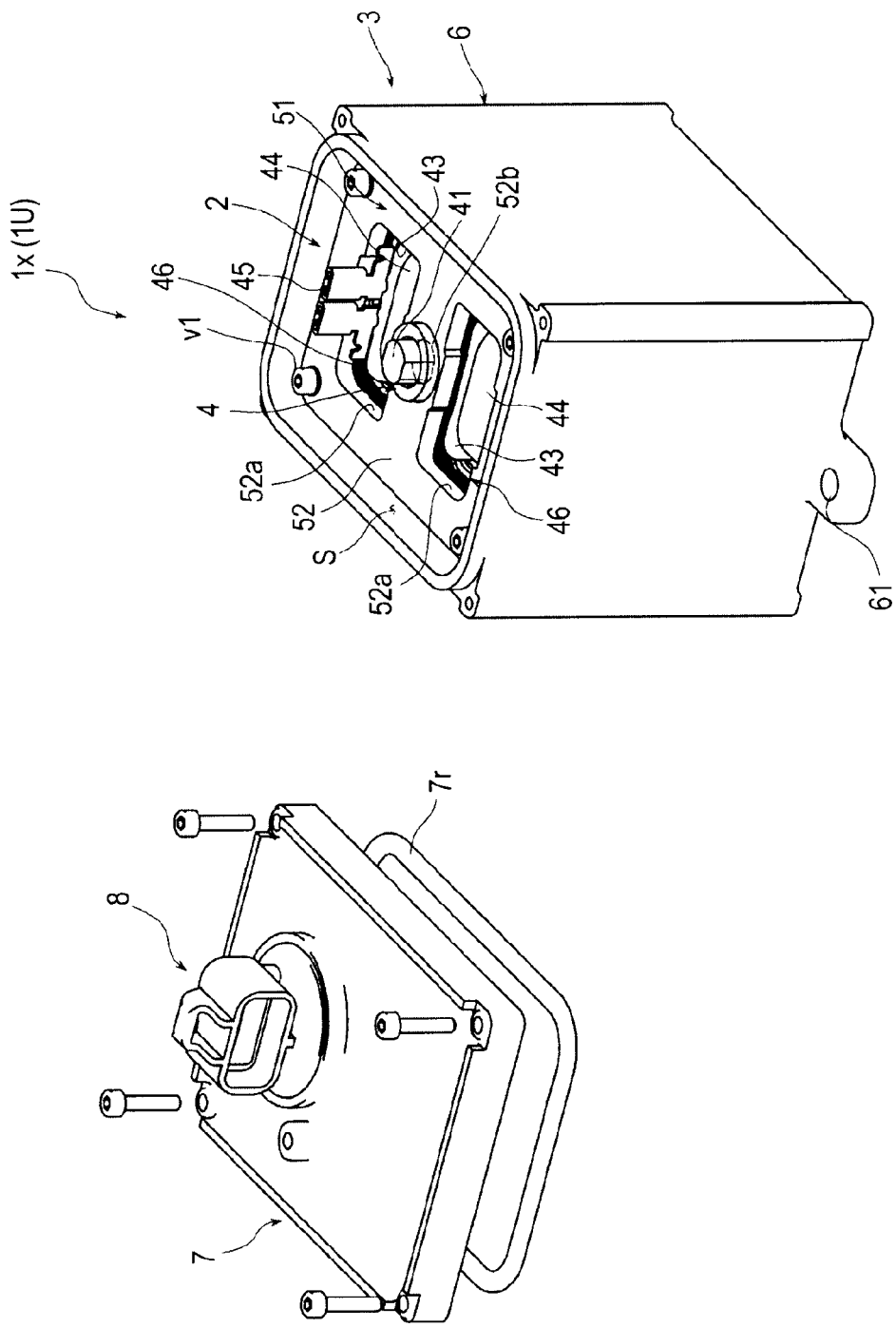
FIG. 2 is an exploded perspective view of the linear actuator unit.
Figure 3:
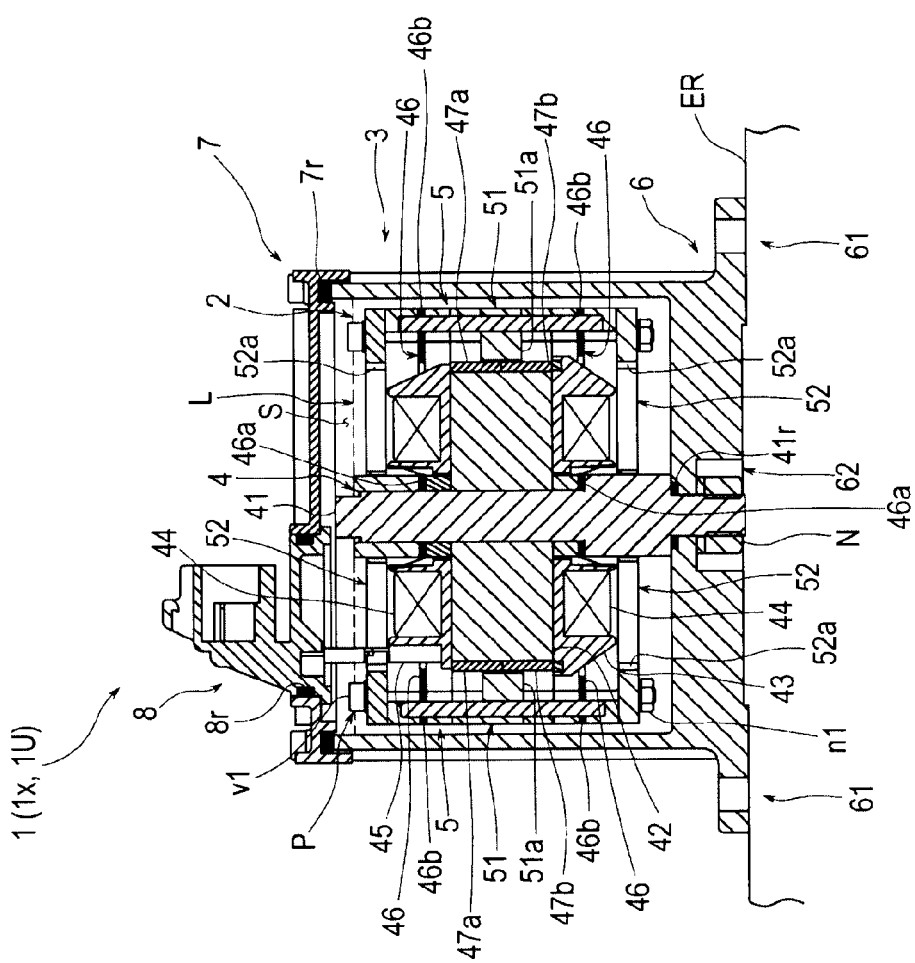
FIG. 3 is a schematic central front sectional view of the linear actuator unit.

A linear actuator 1x according to the present embodiment is provided in, for example, an engine room of a vehicle body of an automobile, which is the object of vibration damping, and is used as a vibration-damping device 1. The linear actuator 1x is driven with an alternating current so as to apply a vibration whose phase is opposite to that of a vibration of the vehicle body caused by the engine or the like, thereby offsetting and suppressing the vibration of the vehicle body. As illustrated in FIGS. 1 to 3, the linear actuator 1x includes a linear actuator body 2 that is housed in a casing 3, which is filled with oil L, in a liquid-tight state.

Figure 4:
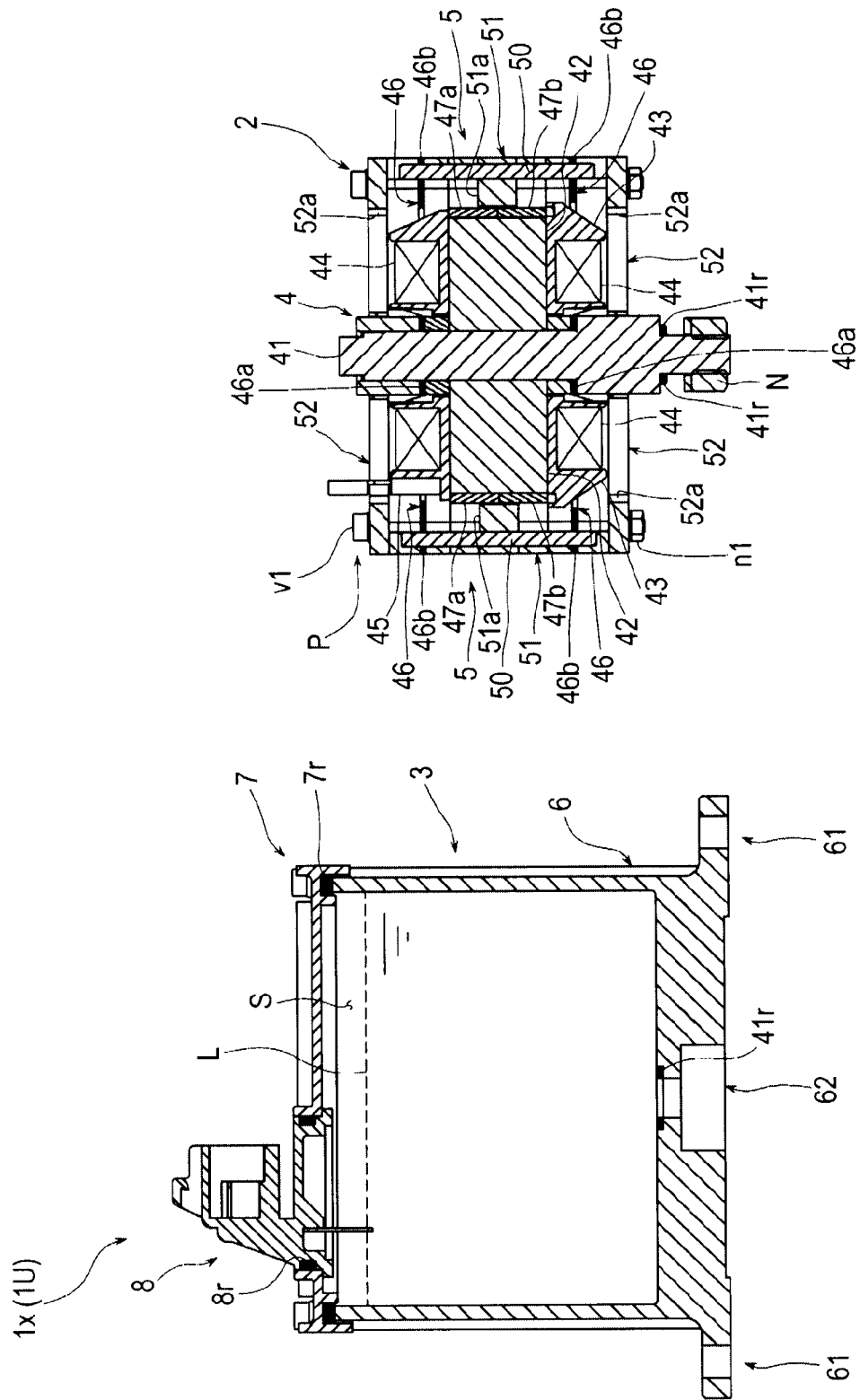
FIG. 4 is a sectional view of the linear actuator unit in which a linear actuator body and a casing thereof are separately illustrated.

In the linear actuator 1x according to the present embodiment, an internal space S of the casing 3 is filled with the oil L as liquid material having insulating and lubricating characteristics such that the linear actuator body 2 is substantially submerged, whereby a state where at least the entirety of a coil 44 is submerged in the oil L is created. In FIG. 2, the oil L is not illustrated. In FIGS. 3 and 4, the top surface of the filling oil L is represented by a broken line.

The configuration of the linear actuator 1x will now be described specifically.

As illustrated in FIGS. 2, 3, and 4, the linear actuator 1x includes the linear actuator body 2, the casing 3 that houses the linear actuator body 2, and the oil L that fills the casing 3 and has an electrically insulating characteristic.

As illustrated in FIGS. 2, 3, and 4, the linear actuator body 2 employs a so-called outer-type configuration in which a shaft 41, illustrated in the center in the drawings and described separately below, forms an element of a stator 4 secured to the casing 3, and a mover 5 positioned on the outer side is movable. The shaft 41, i.e., part of the stator 4, is secured to the casing 3, and part of the casing 3 is secured to an arbitrary portion ER in the engine room or the like of the vehicle body, i.e., the object of vibration damping. Thus, the reaction force occurring with the movement of the mover 5 is transmitted to the engine room through the stator 4 and the casing 3.

The stator 4 basically includes the above-mentioned shaft 41, a stator core 42 secured to the shaft 41, a coil bobbin 43 provided on the stator core 42, the coil 44 wound around the coil bobbin 43, a connector 45 projecting upward from the coil bobbin 43 and functioning as an electrode through which the coil 44 is energized, pairs of permanent magnets 47a and 47b provided at lateral ends of the coil bobbin 43 such that the S and N poles of each permanent magnet 47a and the S and N poles of each permanent magnet 47b face respectively opposite sides, i.e., the inner side and the outer side, and a pair of leaf springs 46 as movable supporting portions secured near the upper and lower ends, respectively, of the shaft 41 and movably supporting the mover 5. The coil 44 is wound in such a direction that the direction of the magnetic flux produced in the stator core 42 alternates in a direction orthogonal to the axis of the shaft 41. An alternating current is supplied to the coil 44 from the outside through the connector 45.

The lower end of the shaft 41 is tapped. Therefore, after the shaft 41 is inserted into a shaft-receiving hole 62 provided in a casing body 6 described separately below, the shaft 41 is secured to the casing body 6 with a nut N screwed thereonto from the outside. Here, an O-ring 41r is interposed between a position near the lower end of the shaft 41 and the casing body 6. Thus, the oil L is effectively prevented from leaking out from between the shaft 41 and the shaft-receiving hole 62.

The leaf springs 46 according to the present embodiment are each a thin plate having an "8" shape in plan view that is substantially the same as the shape of end plates 52 described separately below referring to FIG. 2. The leaf springs 46 each have a central portion 46a thereof secured to the shaft 41 and a peripheral portion 46b thereof vertically held, i.e., sandwiched, between a mover body 51 and a corresponding one of the end plates 52. The peripheral portion 46b referred to herein may form the four corners or two opposite edges of each leaf spring 46.

The mover 5 has a rectangular barrel-like shape in plan view extending along the inner surface of the casing 3 and basically includes the mover body 51 forming the main body of the mover 5 and the end plates 52 securing, in combination, the four corners of the mover body 51 at the top and at the bottom, respectively, with four sets of fastening members P. The end plates 52 according to the present embodiment each have an "8" shape in plan view as illustrated in FIG. 2, with a shaft-insertion hole 52b provided in the center thereof and into which the shaft 41 is inserted. The mover body 51 is supported in such a manner as to be held, i.e., sandwiched, between the end plates 52 from the top and the bottom and to be screwed at the four corners thereof with the fastening members P. The fastening members P basically include, for example, long bolts v1 extending through the upper and lower end plates 52 and nuts n1 screwed onto the ends of the respective long bolts v1 projecting from one of the end plates 52. Part (an outer wall portion) of the mover body 51 functions as a spacer realizing the sandwiched state of the leaf springs 46. The configuration of securing the mover 5 to the stator 4 is not limited to the above configuration, and any other known configuration may be applied thereto. The end plates 52 each have two openings 52a in its "8" shape, thereby effectively avoiding interference with the stator 4 when the mover 5 moves up and down.

In FIG. 5, reference numeral 50 denotes a barrel-like pin, illustrated in sectional view, provided for securing the mover 5 coaxially and concentrically with the stator 4.

As illustrated in FIGS. 2 and 3, the casing 3 is basically, for example, an aluminum die cast that can house the linear actuator body 2 with part of the linear actuator body 2, i.e., the stator 4, secured thereto. The casing 3 includes the casing body 6 housing the linear actuator body 2, a lid 7 capable of liquid-tightly sealing the casing body 6 from the top, and a waterproof upper connector 8 provided on the lid 7 and being connectable to external wiring. The casing body 6 has securing portions 61 provided at two positions on the bottom outer side at which the casing body 6 is secured to the arbitrary portion ER of the vehicle body, i.e., the object of vibration damping, and also has the shaft-receiving hole 62 at which the shaft 41 is secured. The casing body 6 is screwed at the four corners thereof with an O-ring 7r provided at the top end thereof. Thus, leakage of the oil L from between the casing body 6 and the lid 7 is effectively prevented. The lid 7 is screwed to the casing body 6 with the O-ring 7r interposed therebetween as described above, and the upper connector 8 is attached to the lid 7 with another O-ring 8r interposed therebetween. Thus, leakage of the oil L from between the lid 7 and the upper connector 8 is effectively prevented. The upper connector 8 is connected at the bottom end thereof to the connector 45 of the stator 4, thereby guiding the external electric current to the connector 45.

In the present embodiment, the O-rings 41r, 7r, and 8r are provided at the respective positions of the casing 3 to which relevant elements are attached. Thus, the internal space S is made at least liquid-tight, and leakage of the oil L is prevented.

In the linear actuator 1x according to the present embodiment, the internal space S defined between the casing 3, having an exemplary capacity of 200 cc, and the linear actuator body 2 is filled with, for example, about 180 cc to 190 cc of oil L having an insulating characteristic up to a level represented by the broken line illustrated in FIG. 3, whereby substantially the entirety of the linear actuator body 2 is submerged in the oil L. Thus, about 90% to 95% of the internal space S defined between the casing 3 and the linear actuator body 2 is filled with the oil L. In this manner, the coil 44 is completely submerged in the oil L. In addition, the oil L fills the internal space S such that the entirety of ranges in which the leaf springs 46 are movable by undergoing elastic deformation with the movement of the mover 5 is submerged.

When an alternating current is supplied to the linear actuator 1x through the upper connector 8, the current is supplied to the coil 44 through the connector 45 and the mover 5 moves up and down in the axial direction of the shaft 41 relative to the stator 4. For example, as illustrated in FIG. 5(a), when magnetic flux in the rightward direction in the drawing is produced in the stator core 42, the magnetic force thereof enhances the magnetic force of the permanent magnet 47b, i.e., one of each pair of permanent magnets 47a and 47b provided at the ends and functioning as magnetic poles of the stator 4, and weakens the magnetic force of the other permanent magnet 47a. Therefore, the mover body 51 moves with a thrust acting in a direction represented by downward arrows illustrated in the drawing so that the magnetic flux that has passed through the permanent magnet 47b whose force is enhanced forms the shortest magnetic path to a corresponding one of the projections 51a of the mover body 51, the projections 51a facing the permanent magnet 47b and functioning as magnetic poles of the mover 5. In this case, the leaf springs 46 having the central portions 46a thereof supported by the shaft 41 and the peripheral portions 46b thereof supporting the mover 5 bend downward as represented by respective imaginary lines illustrated in the drawing, whereby the mover 5 is movably supported. In contrast, as illustrated in FIG. 5(b), when magnetic flux in the leftward direction in the drawing is produced in the stator core 42, the magnetic force thereof enhances the magnetic force of the permanent magnet 47a, i.e., one of each pair of permanent magnets 47a and 47b provided at the ends and weakens the magnetic force of the other permanent magnet 47b. Therefore, the mover body 51 moves with a thrust acting in a direction represented by upward arrows illustrated in the drawing so that the magnetic flux that has passed through the permanent magnet 47a whose force is enhanced forms the shortest magnetic path to a corresponding one of the projections 51a of the mover body 51, the projections 51a facing the permanent magnet 47a. In this case, the leaf springs 46 having the central portions 46a thereof supported by the shaft 41 and the peripheral portions 46b thereof supporting the mover 5 bend upward as represented by respective imaginary lines illustrated in the drawing, whereby the mover 5 is movably supported. Since the direction of the magnetic flux changes in correspondence with the phase and frequency of the alternating current, the mover 5 correspondingly reciprocates vertically. With the supply of alternating current, the vibration-damping device 1 produces a vibration whose phase is opposite to that of the vibration occurring in the object of vibration damping, thereby suppressing the vibration of the object of vibration damping, i.e., the vehicle body. The outer wall portion of the mover body 51, the end plates 52, and so forth allow the magnetic flux to pass therethrough when the above magnetic path is formed. In a non-energized state where no electricity is supplied, the leaf springs 46 offset the mover body 51 to the center of movement where the centers of the projections 51a of the mover body 51 are aligned with the boundary between each pair of permanent magnets 47a and 47b.

In such reciprocation of the mover 5, since the lower ends of the movable ranges of the mover 5 and the lower end plate 52 are originally set close to the inner surface of the casing body 6 as illustrated in FIG. 3, when the mover 5 moves downward, some oil L below the lower end plate 52 is pushed away from the space between the lower end plate 52 and the inner surface of the casing body 6 and thus flows toward the upper leaf spring 46 along the inner surface of the casing body 6. During this operation, the oil L flowing upward quickly conducts heat conducted thereto from the coil 44 to the casing body 6, and the heat is then released from the casing body 6 to the outside. Meanwhile, the upper end of the movable range of the end plate 52 of the mover 5 is set close to the surface of the oil L that fills 90% to 95% of the internal space and close to the lower surface of the lid 7. Therefore, when the mover 5 moves upward, some oil L above the upper leaf spring 46 is pushed away from the space between the upper leaf spring 46 and the lid 7 and then flows downward along the inner surface of the casing body 6, whereby, as with the above case, the heat of the oil L is quickly released to the outside of the casing body 6.

The above flow of the oil L is particularly pronounced near the peripheral portions 46b of the upper and lower leaf springs 46. Therefore, the contact points between the mover body 51 and the leaf springs 46 where repeated minute relative slipping accompanied by friction force occurs are particularly frequently lubricated with the oil L, usually. Hence, fretting due to the reciprocation of the leaf springs 46 is effectively avoided. Although the amount of relative slipping is small, the oil L also spreads into the securing points between the shaft 41 and the leaf springs 46, preventing the occurrence of fretting.

Particularly, in the present embodiment, the internal space S is assuredly made liquid-tight with the O-rings 41r, 7r, and 8r provided at the respective positions of the casing 3 to which relevant elements are attached. Thus, the oil L flowing within the internal space S as described above is assuredly prevented from leaking to the outside.

Furthermore, in the present embodiment, since the linear actuator body 2 is completely enclosed by the casing 3, the reliability and durability of the linear actuator are effectively maintained even if the engine room is put in a harsh environment with water, mud, or the like.

A preferred manufacturing method of assembling the linear actuator 1x according to the present embodiment as a unit 1U includes the following. After the linear actuator body 2 is housed in the casing 3 in a housing step S1, the internal space S is filled with the oil L in a filling step S2, and the casing 3 is then sealed with the lid 7 in a sealing step S3. In conjunction with the housing step S1, the filling step S2, and the sealing step S3, a bubble-removing step X for avoiding the formation of bubbles F between the linear actuator body 2 and the oil L is performed.

The bubble-removing step X will now be described in detail with reference to FIGS. 6 and 7, basically.

Figure 6:
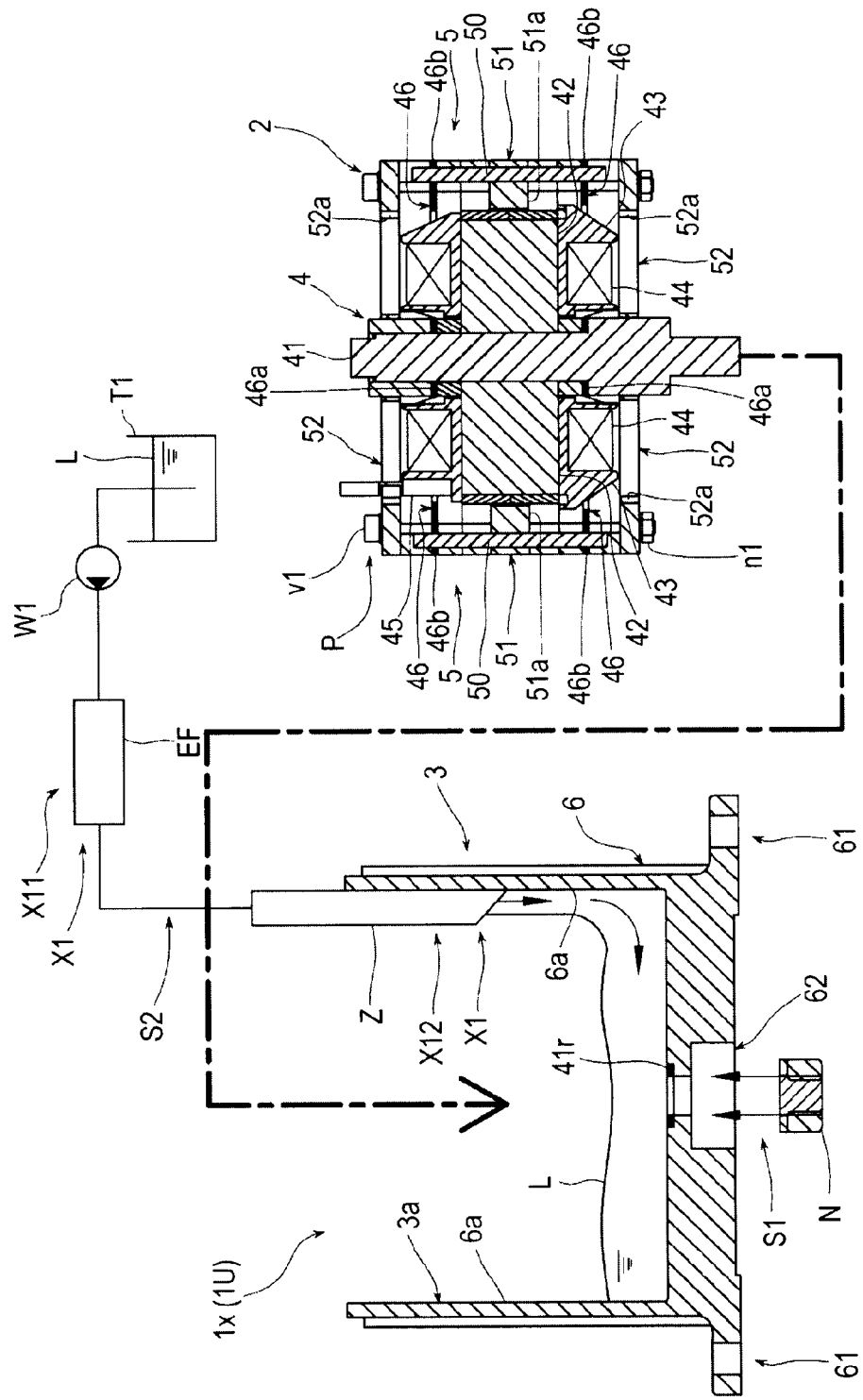
FIG. 6 is a diagram illustrating steps of manufacturing the linear actuator unit.
Figure 7:
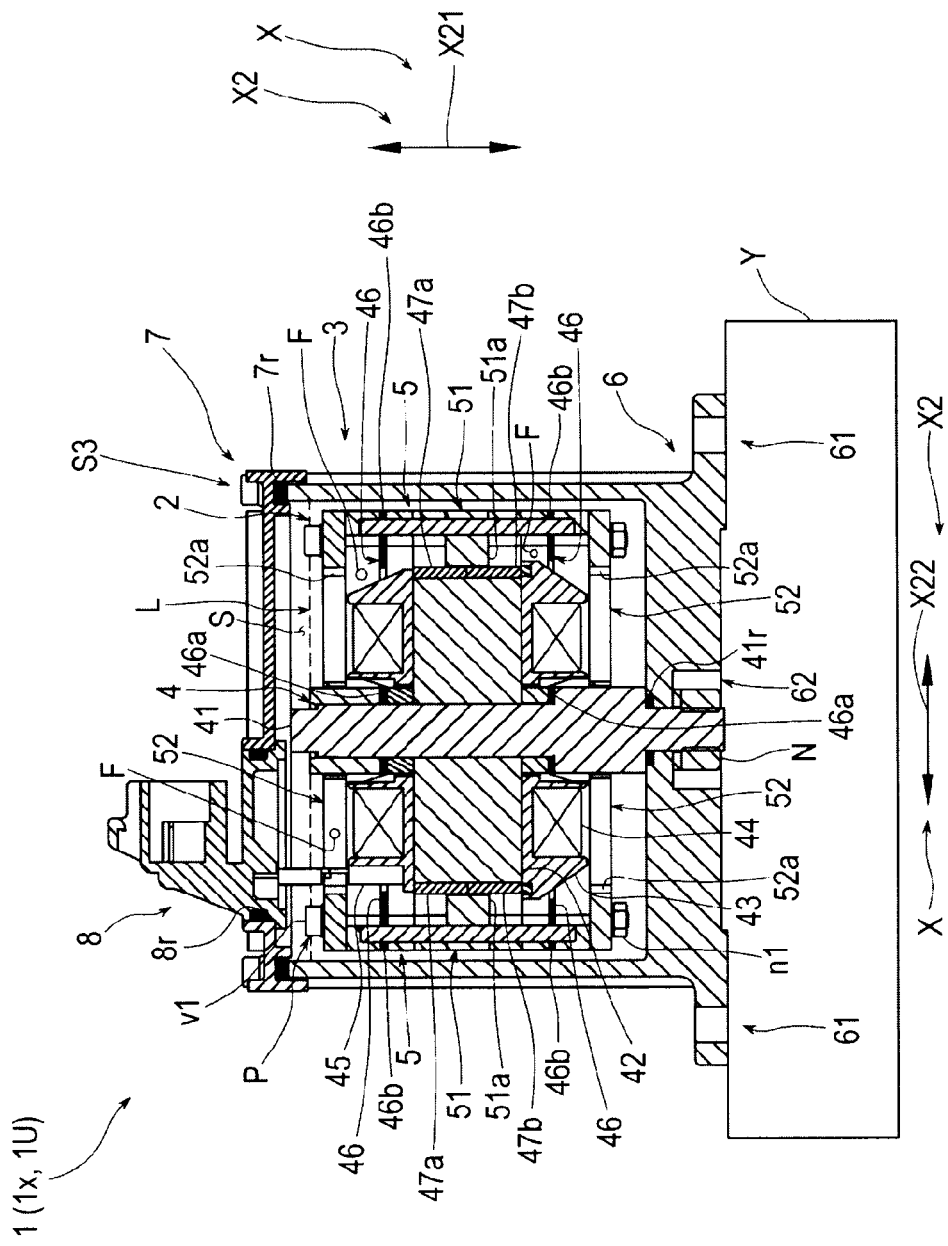
FIG. 7 The same as above.

The bubble-removing step X includes a during-filling deaerating step X1 illustrated in FIG. 6 in which the above bubbles are removed before the filling step S2 is completed and a post-filling deaerating step X2 illustrated in FIG. 7 in which any bubbles formed between the oil L as liquid material having been supplied in the filling step and the linear actuator body 2 are separated from the linear actuator body 2.

The during-filling deaerating step X1 includes, as illustrated in FIG. 6, a during-transfer deaerating step X11 in which any gas, such as air, dissolved in the oil L is removed in advance with a deaerating filter EF and an inner-wall discharging step X12 in which the oil L is supplied through a discharge nozzle Z for discharging the oil L by placing the discharge nozzle Z in contact with an inner wall 3a of the casing 3 in advance in the filling step S2. Exemplary filters available as the deaerating filter EF include a filter in which the oil L is supplied into one of two chambers separated by a partition provided therein and the pressure in the other chamber is reduced, whereby any bubbles in the oil L in the one chamber are taken away into the other chamber. The partition may be a waterproof moisture-permeable sheet member or the like described separately below. In the inner-wall discharging step X12, the tip of the discharge nozzle Z is cut obliquely so that the oil L tends to run down along the inner wall 3a. According to need, the casing 3 itself is tilted so that the oil L tends to run down along the inner wall 3a. Thus, taking in of ambient air is avoided.

The post-filling deaerating step X2 includes, as illustrated in FIG. 7, a moving step X21 in which the mover 5 is moved after the filling step S2, a shaking step X22 in which the linear actuator unit 1U itself is shook by setting the casing 3 on a vibrating device Y and vibrating the casing 3 at a certain frequency, and so forth.

The housing step S1, the filling step S2, and the sealing step S3 will now be described.

First, as illustrated in FIG. 6, the lower end of the shaft 41 of the linear actuator body 2 is inserted into the shaft-receiving hole 62 with the O-ring 41r placed on the casing body 6, and the nut N is then screwed onto the shaft 41, whereby the housing step S1 of securing the shaft 41 to the casing body 6 is performed. Subsequently, in the present embodiment, the inner-wall discharging step X12 is performed in which the discharge nozzle Z is placed in contact with the inner wall of the casing 3, i.e., a sidewall 6a of the casing body 61, as illustrated in FIG. 6.

Subsequently, while the oil L is discharged from the discharge nozzle Z placed in contact with the sidewall 6a, the oil L having been subjected to the during-transfer deaerating step X11 illustrated in the drawing is supplied. Details of the during-transfer deaerating step X11 have already been described. In the during-transfer deaerating step X11, the oil L is deaerated before the oil L reaches the discharge nozzle Z. Specifically, as illustrated in the drawing, in a path along which the oil L stored in a tank T1 is supplied into the casing 3 with a pump W1, the deaerating filter EF is interposed between the pump W1 and the discharge nozzle Z, whereby almost all air dissolved in the oil L is removed. The oil L is supplied into the casing 3 through the above inner-wall discharging step X12 without taking in the ambient air.

When the casing 3 is filled with a predetermined amount of oil L, the filling step S2 is completed and the sealing step S3 is performed in which the lid 7 is attached to the casing 3 and the casing 3 is sealed temporarily.

That is, the above series of steps corresponds to the during-filling deaerating step X1 for preventing, in advance, bubbles F from adhering to the linear actuator body 2.

Subsequently, as illustrated in FIG. 7, the post-filling deaerating step X2 including the moving step X21, the shaking step X22, and so forth is performed so as to remove any bubbles F having adhered to the linear actuator body 2. In the moving step X21, an electric current at a certain vibration frequency is supplied to the coil 44 through the connector 45, whereby the mover 5 is moved up and down as indicated by a vertical arrow illustrated in the drawing. In the shaking step X22, the casing 3 is set on the vibrating device Y including an eccentric weight, an ultrasonic vibrating element, or the like, and the casing 3 is vibrated by the vibrating device Y, whereby the oil L in the casing is shook, i.e., agitated, as indicated by a lateral arrow illustrated in the drawing. Considering that any bubbles and the like that are not removable at a frequency for driving the mover 5 are to be removed, the vibration frequencies in these steps are desirably set so as to be within a vibration frequency range that are higher than the driving frequency.

By performing the moving step X21 and the shaking step X22, any bubbles F adhered to the linear actuator body 2 are separated therefrom, gather in an upper area of the internal space S, and are mixed into a pocket of air that is present in the upper area of the internal space S. The above series of steps corresponds to the post-filling deaerating step X2 for removing any bubbles adhered to the linear actuator body 2 together with dissolved air.

Through the above steps, the manufacturing method according to the present embodiment is completed. According to need, the filling step S2 and the sealing step S3 may be repeated by removing the lid 7 again, adding the oil L into the upper area of the internal space, and attaching the lid 7 to the casing body 6 again. The oil L is preferably supplied such that a pocket of air that can absorb at least the amount of its volume expansion within an operating temperature range is provided. Alternatively, the oil L may be supplied such that the casing 3 becomes full or, as long as a good heat-releasing characteristic is provided, at least part of the coil 44 is submerged therein. If the casing 3 is made full of the oil L, the oil L may be of such a kind that, for example, its volume expansion is extremely small, or part of the casing 3 may form an elastic film so that the volume expansion of the oil L can be absorbed.

In the linear actuator 1x according to the present embodiment having the above configuration, since the entirety of the coil 44 is submerged in the oil L as liquid material, heat generated by the coil 44 is quickly released to the oil L and is further conducted from the oil L to the casing 3. Since the oil L spreads out into gaps in the coil 44, of course, the heat is very efficiently released. Thus, the thermal resistance between the linear actuator body 2 and the casing 3 is significantly reduced compared with that in the known art. Since the stator core 42, the shaft 41, and other elements are also submerged in the oil L, the occurrence of rusting and the like is prevented. Moreover, the necessity for the surface treatment of iron material is effectively eliminated without using costly stainless steel material. Furthermore, since the linear actuator body 2 has improved insulating performance, improved reliability is realized. In addition, since the oil L is constantly agitated by the movement of the mover 5, good thermal conductivity is realized. Moreover, heat conducted to the oil L is released to the outside of the casing 3 not only from the contact points between the casing 3 and the arbitrary portion ER of the vehicle body but also from other surfaces of the casing 3. Thus, in the present embodiment, the rise of temperature due to heat generation by the coil 44 is effectively suppressed, and the thermal time constant becomes long. Therefore, the reductions in the rated thrust and instantaneous maximum thrust of the linear actuator 1x itself due to heat generation by the coil 44 are significantly suppressed. Consequently, the size of the linear actuator body 2 can be reduced. Accordingly, size and weight reduction of the linear actuator 1x and thus the vibration-damping device 1 as a whole is effectively realized.

Particularly, in the present embodiment, the shaft 41 forming part of the stator 4 is secured at the shaft-receiving hole 62 of the casing 3, and part of the casing 3 is secured to the object of vibration damping at the securing portions 61, whereby the reaction force occurring with the movement of the mover 5 is accurately conducted through the stator 4 and the casing 3. Therefore, desired rated thrust and instantaneous maximum thrust are directly and efficiently conducted, i.e., reflected, to the vehicle body, as described above.

Furthermore, in the present embodiment, to improve reliability by appropriately maintaining the accuracy in supporting the mover 5 with respect to the stator 4, there are provided the leaf springs 46 that allow, by undergoing elastic deformation, the stator 4 to support the mover 5 such that the mover 5 is reciprocatable, and the oil L fills the internal space S such that the entirety of the movable ranges of the leaf springs 46 is submerged therein. Therefore, the occurrence of the above-mentioned friction, i.e., fretting, is effectively avoided over a long period of time without any known fretting measures of, for example, providing copper-plate spaces or injecting grease at portions where the leaf springs 46 are overlaid.

Meanwhile, if the leaf springs 46 are employed in the known art, since there is no mechanical loss due to friction unlike the cases of roller, sliding, and other kinds of bearings, the amplification of resonance based on the eigenfrequencies or the like of the leaf springs 46 themselves becomes extremely high, possibly making the operation around the eigenfrequencies instable. Therefore, the linear actuator 1x needs to be controlled avoiding such frequencies. Moreover, the leaf springs 46 resonate at relatively high frequencies in the second-order and third-order deformation modes. Furthermore, if the leaf springs 46 each have a layered structure, slight movements of layers to and away from one another may cause rattling, for example, leading to a problem that the leaf springs 46 themselves generate noise. In contrast, in the present embodiment in which the oil L having a higher viscosity than air is supplied in the internal space S, the leaf springs 46 are damped and the behaviors of the leaf springs 46 are thus stabilized, realizing a very smooth operation. This contributes to reduction of noise also in the case where the leaf springs 46 each have a layered structure, of course. Particularly, in the present embodiment, the resonance caused by the eigenfrequencies of the casing 3 and the shaft 41 of the linear actuator body 2 is significantly suppressed by the damping effect produced by the oil L, improving the anti-vibration and shock-resistance characteristics of the actuator. That is, the suitability of the linear actuator 1x as a vehicle-mounted vibration-damping device 1 is absolutely improved more than that in the known art.

To reduce the thickness of the casing 3 and to further improve the heat-releasing characteristic of the casing 3, the present embodiment employs an exemplary measure in which the oil L fills 90 to 95% of the internal space S. That is, by filling 90 to 95% of the capacity, supposed to be 200 cc, of the internal space S, which is fully filled with air in the known art, the volume of air in the internal space S of the casing 3 is significantly reduced to 20 cc or smaller in the present embodiment on the basis of a simple calculation. Correspondingly, the amount of expansion/contraction of air caused by the rise of temperature is significantly reduced. Consequently, even if the casing 3 is not a completely sealable container, the amount of moisture in the air is reduced and deterioration of the oil L due to oxidation caused by the moisture is reduced, leading to an extension of the life of the liquid material. Furthermore, if the casing 3 is a breathable container, a problem of internal pressure is solved. Consequently, the thickness of the casing 3 is reduced and the number of selectable sealing materials is increased, whereby costs can be reduced. In addition, in conjunction with the agitation of the oil L caused by the movement of the mover 5, the oil L is in contact with almost the entirety of the inner surface of the casing 3 and therefore releases heat from almost the entirety of the surface of the casing 3. This means that heat is released much quicker in the actual situation where the vehicle runs, with an additional cooling effect of relative wind upon the casing 3.

In this case, the situation in which the oil L as liquid material is supplied is not so severe as that in a case of, for example, a liquid bearing where oil is supplied into a sealed space and the space is assuredly made tightly filled. Moreover, the casing 3 may not necessarily be sealed completely. Therefore, generally speaking, it is sufficient to supply the oil L from an oil tank into the casing 3 with a pump. If, however, very small bubbles are formed in the oil L or some air is dissolved in the oil L in an early stage of the filling step, the bubbles are difficult to remove from the oil L even by the subsequent agitation of the oil L caused by the movement of the mover 5. If such bubbles are taken into gaps in the coil 44 or adhere to the inner wall of the casing 3 and the contact areas between the oil L and the coil 44 and between the oil L and the inner wall of the casing are reduced, the efficiency in conducting heat from the coil 44 to the casing 3 through the oil L may be reduced, substantially resulting in a reduction in the effect produced by submerging the coil 44 in the oil L in the casing 3.

Accordingly, a new focus has been placed on the bubble-removing step X because of the following reason. When the linear actuator 1x is activated after the oil L is supplied, the mover 5 agitates the oil L. This may cause air in an air layer in the upper area to be taken into the oil L. Therefore, removing bubbles in the early stage of the filling step may seem to be meaningless. Nevertheless, by performing the bubble-removing step in the early stage of the filling step, oil L, which contains no bubbles, fully spreads into gaps in the coil 44 and over the inner wall of the casing 3. Meanwhile, once the linear actuator 1x is activated, bubbles that may be produced at the activation have large diameters and are difficult to spread into very narrow spaces, such as spaces in the coil 44, and to adhere to the inner wall of the casing 3. Even if any bubbles adhere, such bubbles are easily removed. Therefore, a state where thermal conductivity is not liable to be reduced is created.

Thus, in the method of manufacturing the linear actuator unit 1U according to the present embodiment, since the linear actuator unit 1U is completed while any bubbles F adhered to the linear actuator body 2 and any air dissolved in the oil L are effectively removed in the bubble-removing step X, problems are effectively avoided in that the heat-releasing effect is locally reduced because of adhesion of bubbles F, that portions to which bubbles F adhere wear more than other peripheral portions, and so forth. Thus, the reductions in the rated thrust and instantaneous maximum thrust of the linear actuator unit 1U itself due to adhesion of bubbles F are effectively suppressed. Consequently, a linear actuator unit 1U, and a vibration-damping device 1 also, that is small and light and has a good heat-releasing characteristic is effectively provided.

Particularly, by performing the bubble-removing step X, areas around the leaf springs 46 as movable supporting portions where fretting wear tends to be pronounced are tightly submerged in the oil L. Therefore, problems are effectively avoided in that portions of the leaf springs 46 to which bubbles F adhered wear out locally and that frictional heat concentrates on such portions. Meanwhile, the leaf springs 46 resonate at relatively high frequencies in the second-order and third-order deformation modes. Furthermore, if the leaf springs 46 each have a layered structure, slight movements of layers to and away from one another cause rattling. Therefore, the leaf springs 46 themselves are liable to generate noise. In the present embodiment, however, the oil L having a higher viscosity than air is supplied into the internal space S, whereby the leaf springs 46 are damped and the behaviors of the leaf springs 46 are thus stabilized, realizing a very smooth operation.

In this case, if the leaf springs 46 each have layered structure, bubbles F are particularly liable to adhere to layered portions. In the present embodiment, however, bubbles F are not liable to adhere to the layered portions because of the during-filling deaerating step X1 included in the bubble-removing step X, and, even if any bubbles F adhere to the layered portions, such bubbles F are assuredly removed from the leaf springs 46 in the post-filling deaerating step X2. Therefore, the above-described effect produced by supplying the oil L is assuredly enjoyed at the layered portions. Thus, fretting wear and noise generation are more effectively suppressed.

More specifically, the during-filling deaerating step X1 in which the oil L is deaerated with the deaerating filter EF before the filling step S2 is performed as one of the steps included in the bubble-removing step X according to the present embodiment. Therefore, air dissolved in the oil L supplied is prevented, in advance, from forming bubbles F because of the movement of the mover 5 and other factors occurring after the completion. Furthermore, since the inner-wall discharging step X12 in which the oil L is supplied in such a manner as to run down along the inner wall 3a is performed, the possibility that bubbles F may be formed with fresh air taken in at the outlet of the discharge nozzle Z is essentially eliminated.

Meanwhile, the post-filling deaerating step X2, i.e., the moving step X21 in which the linear actuator body 2 as a whole is moved and the shaking step X22 in which the casing 3 as a whole is vibrated, is performed after the filling step S2. Thus, any bubbles F adhering to portions of the linear actuator body 2 and any air dissolved in the oil L that have not been removed in the filling step S2 are more effectively removed.

Of course, both of the during-filling deaerating step X1 and the post-filling deaerating step X2 may not necessarily be employed. Even if only one of the two is employed, the operational effect of the present invention is produced. Likewise, both of the during-transfer deaerating step X11 and the inner-wall discharging step X12 or both of the moving step X21 and the shaking step X22 may not necessarily be employed, and the operational effect of the present invention is produced even if only one of the two is employed. This also applies in the following description.

In addition, the oil L may fully fill the casing 3 or may fill the casing 3 such that at least part of the coil 44 is submerged therein, as long as a good heat-releasing characteristic is provided.

Thus, the linear actuator 1x according to the present embodiment is configured as follows. The linear actuator body 2 including the stator 4 and the mover 5 that is reciprocatable in a specific direction relative to the stator 4 is housed in the casing 3 in such a manner as to be enclosed by the casing 3 with part of the linear actuator body 2 secured to the casing 3, the casing 3 is filled with the oil L as insulating and lubricating liquid material before or after the linear actuator body 2 is housed and such that the coil 44 of the linear actuator body 2 is submerged in the oil L, and bubble removal for avoiding the formation of bubbles between the linear actuator body 2 and the oil L is performed on the oil L before or after the completion of the filling. Therefore, a particularly good heat-releasing characteristic is provided.

While an embodiment of the present invention has been described above, specific configurations of individual elements are not limited to those described in the above embodiment, and various modifications can be made thereto without departing from the scope of the present invention.

For example, while the above embodiment discloses a mode in which a linear actuator body is housed in a casing, a plurality of linear actuator bodies may be housed in one casing, of course. Moreover, the shape of the casing and the specific mode of the linear actuator are not limited to those described in the above embodiment, and various other modes including known modes may be applied thereto.

Other embodiments of the present invention will now be described. In the following embodiments, elements corresponding to those in the above embodiment are denoted by the same reference numerals and characters as those used in the above embodiment, and detailed description thereof is omitted.

Figure 8:
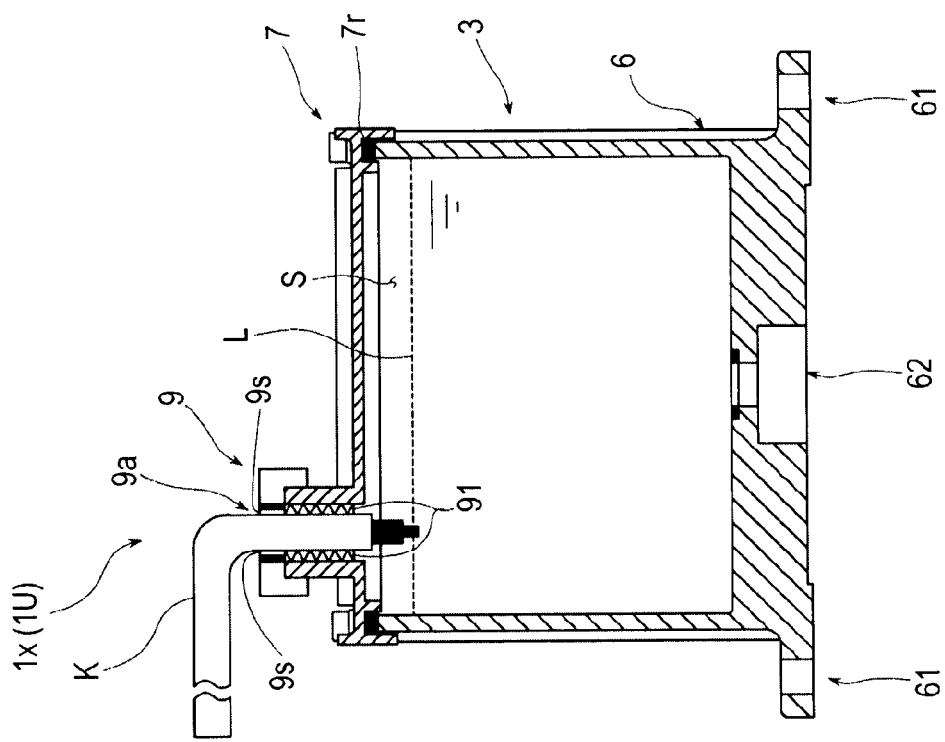
FIG. 8 is a diagram illustrating relevant elements of a linear actuator unit according to another embodiment of the present invention.
Figure 9:
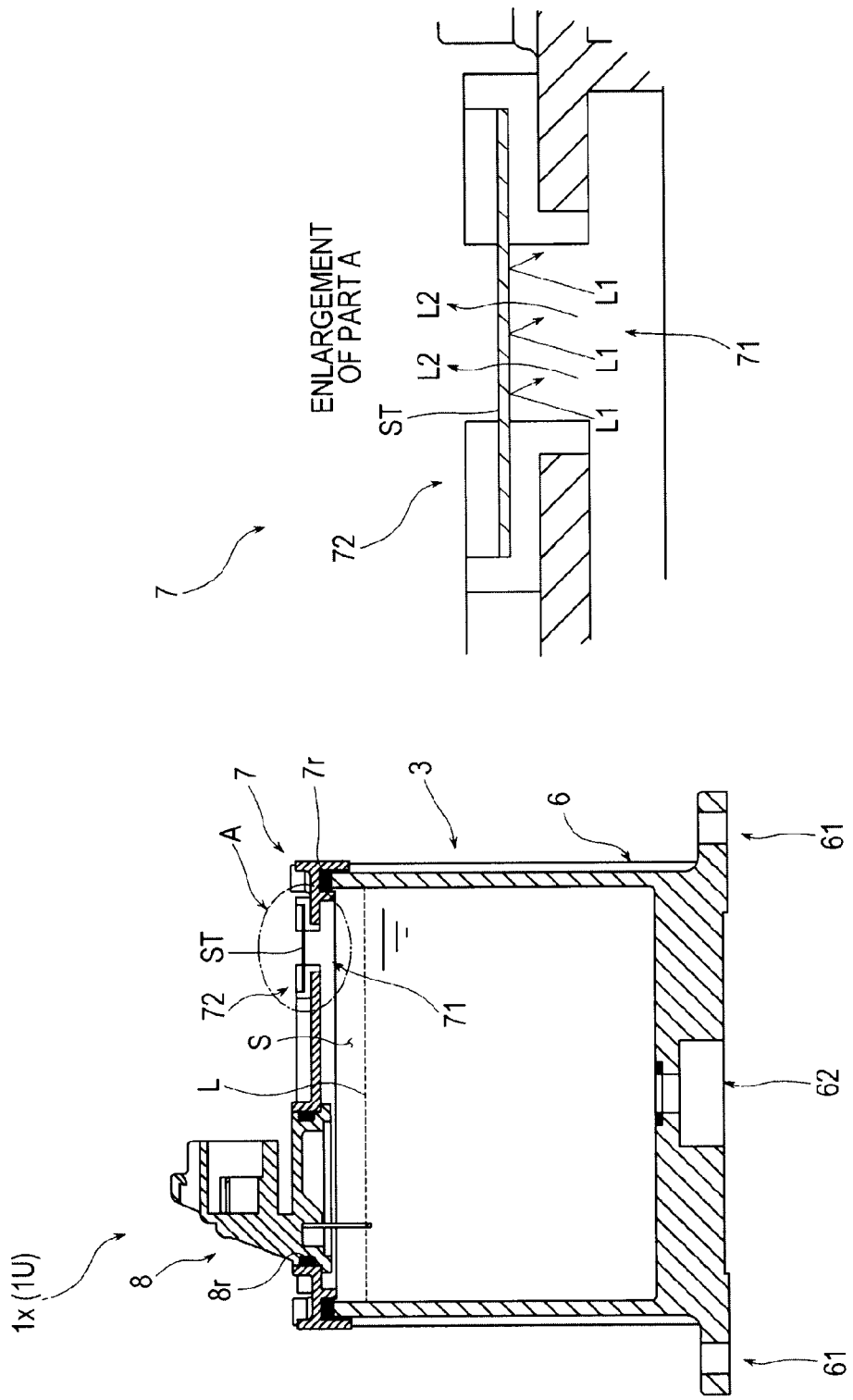
FIG. 9 is a diagram illustrating relevant elements of a linear actuator unit according to a second embodiment of the present invention.

Specifically, while the casing 3 according to the above embodiment is liquid-tight, the casing 3 may not necessarily be liquid-tight, basically, in respective embodiments illustrated in FIGS. 8 and 9. In these drawings, the linear actuator body 2 is not illustrated as a matter of convenience.

For example, an upper connector 9 illustrated in FIG. 8 is configured such that a cable K is directly extracted from part of the casing 3 by using a known cable clamp 91 but without using any waterproof connector. By employing such a configuration, although there is a very small gap 9s between the cable K and an extraction port 9a, oil does not leak out because of surface tension in such a case even if the linear actuator unit 1U is tilted.

Second Embodiment

FIG. 9 illustrates an example in which a waterproof moisture-permeable sheet material ST represented by a material called Gore-Tex (a registered trademark) is embedded in part of the casing 3.

Specifically, the drawing illustrates a configuration in which the lid 7 of the casing 3 has a vent hole 71 and a sheet cap 72 provided over the vent hole 71, the sheet cap 72 including the sheet material ST. In such a configuration, as schematically illustrated separately as an enlargement of part A, the sheet material ST does not allow oil L1 in the form of liquid droplets that are schematically represented by straight-line arrows to pass therethrough but only allows oil L2 in the form of air or gas that is schematically represented by curved-line arrows to pass therethrough. Therefore, in this case also, the internal pressure of the casing 3 does not increase.

Figure 10:
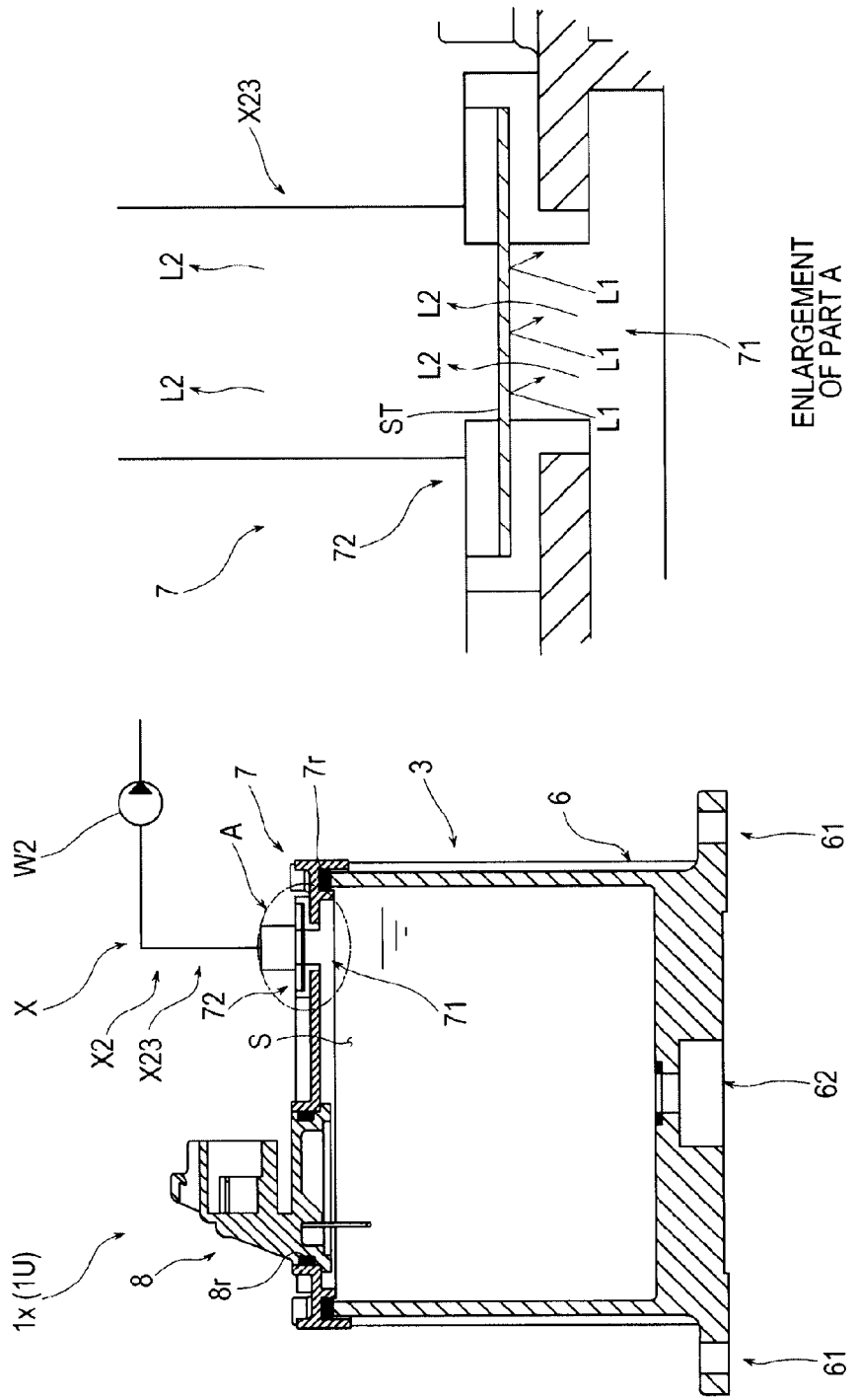
FIG. 10 is a diagram illustrating a manufacturing method corresponding to FIG. 9.

FIG. 10 illustrates an in-casing deaerating step X23 included in the post-filling deaerating step X2 of the bubble-removing step X and in which the oil L is deaerated with a vacuum pump W2 by utilizing the above permeability. That is, in the in-casing deaerating step X23 illustrated in the drawing, the pressure on a side of the sheet material ST opposite a side of the sheet material ST positioned near the oil L is reduced by the vacuum pump W2 as illustrated in the drawing, whereby the removal of any bubbles F in the oil L from the oil L and the removal of any air dissolved in the oil L are promoted.

In such a mode also, not only bubbles F adhering to the linear actuator body 2 but also air dissolved in the oil L are removed. Therefore, the ratio of residual bubbles F and the ratio of newly formed bubbles F after the completion of the linear actuator unit 1U are effectively reduced.

Instead of the waterproof moisture-permeable sheet material ST illustrated in the drawing, a porous material represented by ceramic is considered to produce the same effect. Although it may be extreme, if a small hole is provided in at least part of the casing 3, only air, i.e., gas, is allowed to pass therethrough with the surface tension of the oil L alone and without any leakage of oil. Thus, it is considered that vacuum deaeration can be performed through such a porous material or a hole.

If such vacuum deaeration is performed simultaneously with the vibratory deaeration described in the first embodiment, the deaerating effect is expected to be further multiplied.

Third Embodiment

In the above embodiments, the leaf springs 46 are employed as movable supporting portions. Instead of the leaf springs 46, sliding bearings 48 illustrated in FIGS. 11 and 12 may be employed as movable supporting portions together with springs sp that offset the sliding bearings 48 to the movement centers. Specifically, the sliding bearings 48 may be provided near the upper and lower ends, respectively, of the shaft 41, whereby the end plates 52 are supported by the sliding bearings 48 in such a manner as to be movable up and down. The drawings illustrate a configuration in which the mover 5 is offset to the movement center by interposing a plurality of springs sp between the inner surface of the casing 3 and the upper and lower ends of the mover 5. In such a configuration also, the sliding bearings 48 are submerged in the oil L and therefore function as film lubricants that significantly reduce frictional resistance. Furthermore, since oil films are formed and thus no lack of oil occurs, a long life and a significant reduction of mechanical loss are realized. Thus, very stable low-wear bearings are provided.

Note that the present embodiment does not deny a configuration employing both of the sliding bearings 48 illustrated in these drawings and the leaf springs 46 described in the above embodiments.

Alternatively, in the linear actuator according to the present embodiment, since the mover 5 is retained at the movement center by the magnetic flux produced by the permanent magnets 47a and 47b even in the non-energized state, the springs sp may be omitted. In a case where the mover 5 moves in the vertical direction, the displacement of the mover 5 due to gravity may be offset by an electric current supplied to the coil 44.

If the sliding bearings 48 are employed as movable supporting portions as in the above case, oil spreads into bearing gaps between the shaft 41 and the sliding bearings 48 (if collars or the like are fitted onto the outer perimeter of the shaft 41, between the sliding bearings 48 and the respective collars or the like) and function as oil film bearings. For example, when the mover 5 reciprocates on one specific path along the outer perimeter of the shaft 41 together with the sliding bearings 48 in a state where the bearing gaps between the shaft 41 and the inner perimeters of the sliding bearings 48 are partially narrowed and form narrowed portions, oil in the narrowed portions may be pushed away, depending on the amount and speed of the movement, leading to probable lack of oil film at part of the bearings.

Accordingly, to enhance the performance of lubrication to the sliding bearings 48 and to realize improved reliability and a long life, there may be provided an oil-supplying mechanism as a liquid-material-supplying mechanism that automatically supplies oil L as liquid material into the bearing gaps at the sliding bearings 48 in conjunction with the reciprocation of the mover 5.

Figure 13:
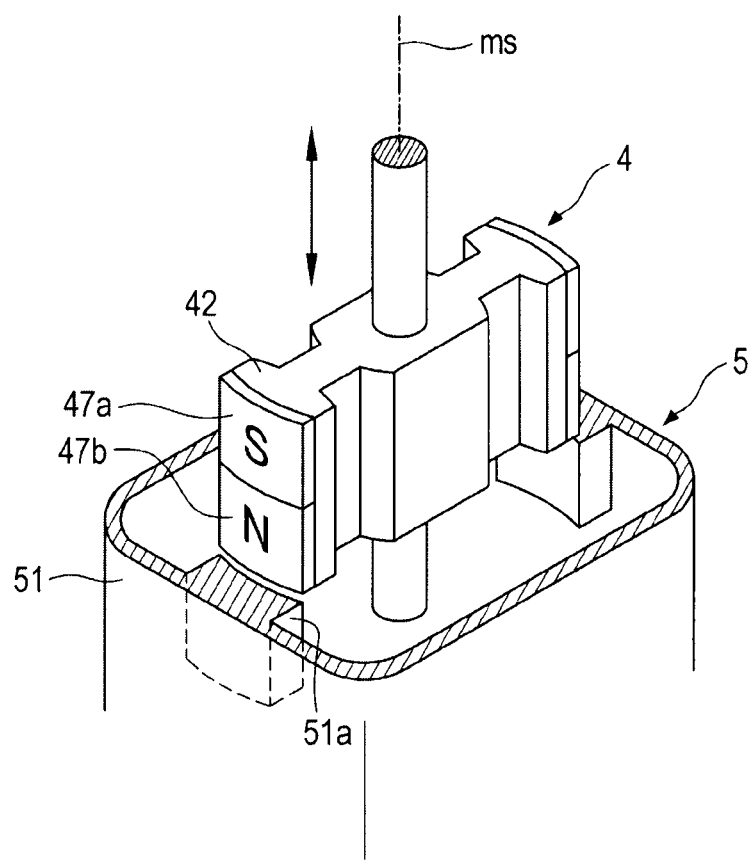
FIG. 13 is a diagram illustrating a modification of FIGS. 11 and 12.
Figure 14:
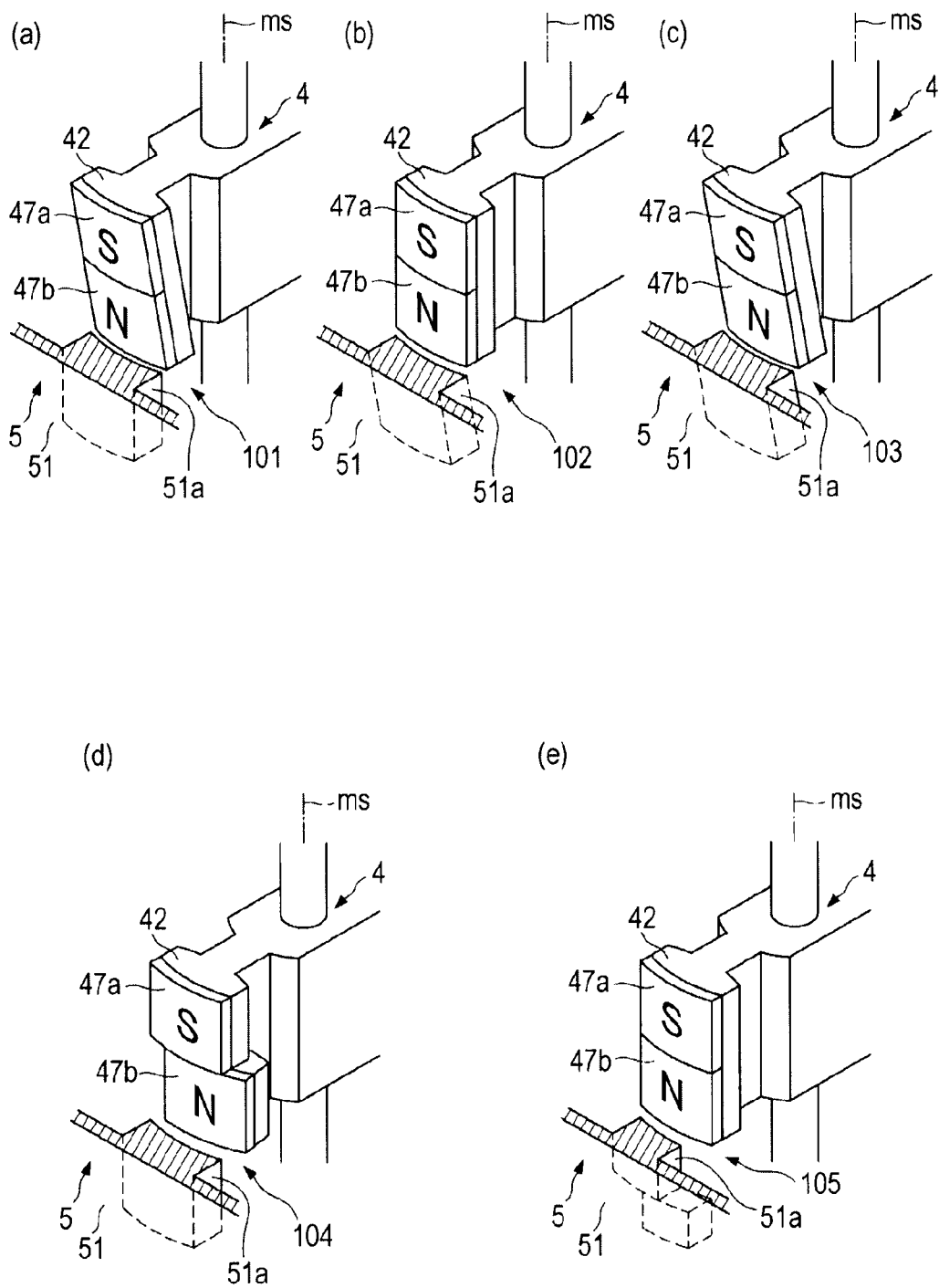
FIG. 14 includes diagrams illustrating modifications of FIGS. 11 and 12.

For example, at least one of the set of permanent magnets 47a and 47b of the stator core 42 as the stator-side magnetic poles and the set of projections 51a of the mover body 51 as the mover-side magnetic poles illustrated in FIG. 13 is angled with respect to an axis ms of reciprocation as in oil-supplying mechanisms illustrated in FIG. 14, whereby any of oil-supplying mechanisms 101, 102, 103, 104, and 105 is provided. Thus, the mover 5 undergoes a twisted movement relative to the stator 4, while undergoing reciprocation, correspondingly to the position in the direction of reciprocation.

Specifically, in the oil-supplying mechanism 101 illustrated in part (a) of the drawing, the magnets 47a and 47b as the stator-side magnetic poles are angled by a certain skew angle with respect to the axis ms of reciprocation.

Figure 11:
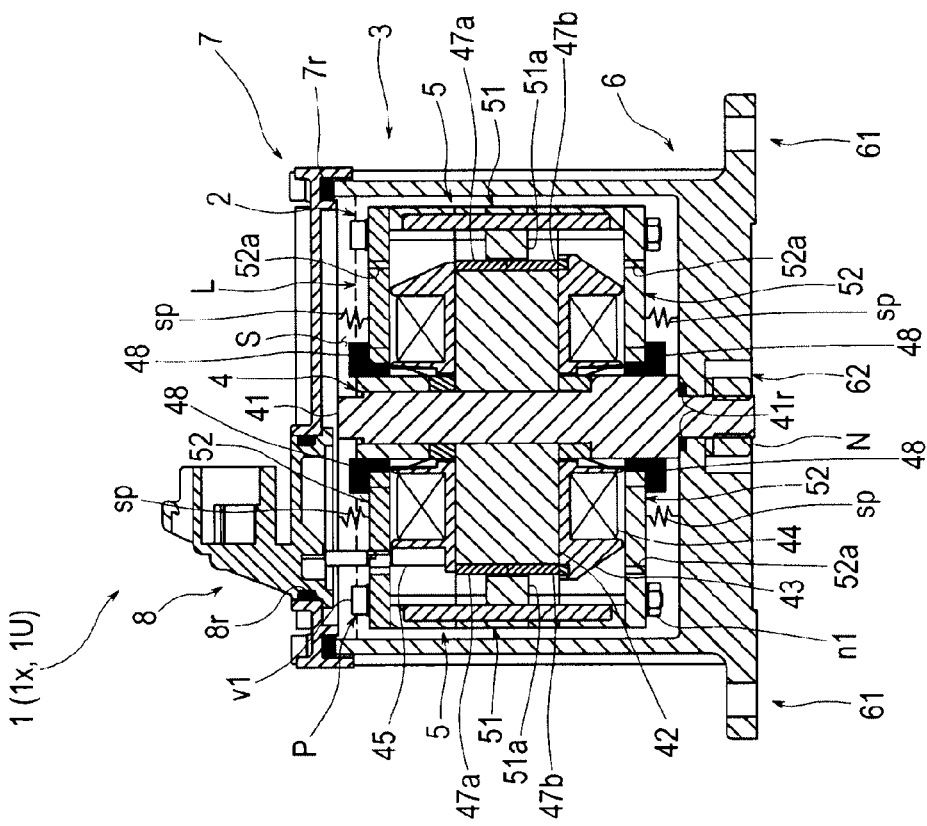
FIG. 11 is a diagram illustrating relevant elements of a linear actuator unit according to a third embodiment of the present invention to which sliding bearings are applied.
Figure 12:
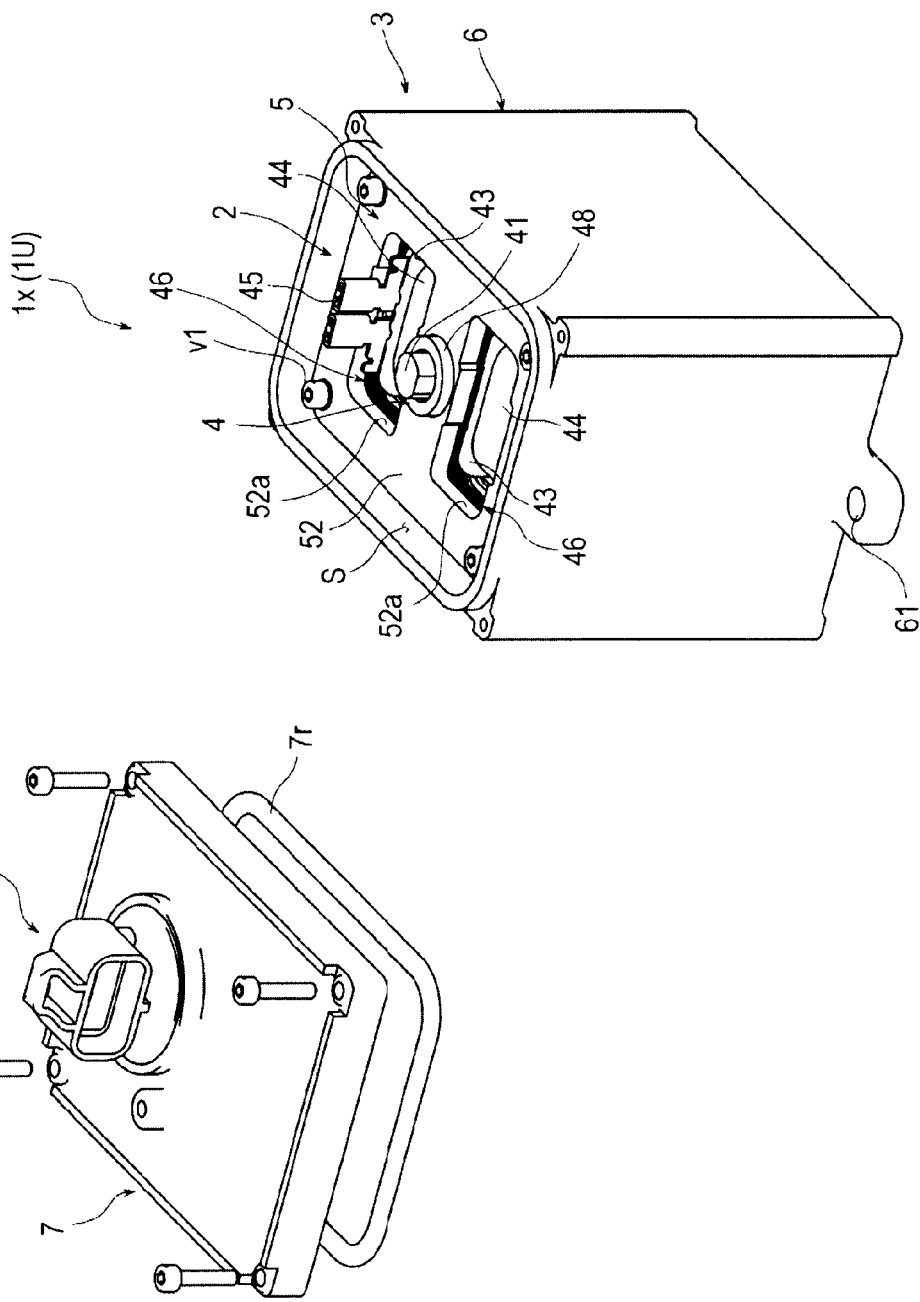
FIG. 12 is an exploded perspective view illustrating the same embodiment.

In this configuration, when the linear actuator 1x is energized and the mover 5 is caused to reciprocate, since the magnets 47a and 47b are angled with respect to the axis ms, the projections 51a as the mover-side magnetic poles are displaced, while reciprocating, in a direction of rotation to such a position as to face the magnets 47a and 47b straight. As illustrated in FIG. 11, the mover 5 is supported in such a manner as to be slidable along the outer perimeter of the shaft 41 with the sliding bearings 48 interposed therebetween. Therefore, when the mover 5 rotates while reciprocating, oil in the bearing gaps at the sliding bearings 48 is forcibly delivered into the narrowed portions by a wedge effect, forming an appropriate oil film at the narrowed portions. Thus, lubrication performance is effectively improved.

Utilizing the same principle, the oil-supplying mechanism 102 illustrated in part (b) of the drawing represents an exemplary case where the projections 51a as the mover-side magnetic poles are angled with respect to the axis ms of reciprocation. The oil-supplying mechanism 103 illustrated in part (c) of the drawing represents an exemplary case where the magnets 47a and 47b as the stator-side magnetic poles and the projections 51a as the mover-side magnetic poles are both angled with respect to the axis ms of reciprocation. The oil-supplying mechanism 104 illustrated in part (d) of the drawing represents an exemplary case where the magnets 47a and 47b as the stator-side magnetic poles are staggered in the circumferential direction. The oil-supplying mechanism 105 illustrated in part (e) of the drawing represents an exemplary case where the projections 51a as the mover-side magnetic poles each include portions staggered in the circumferential direction.

Figure 15:
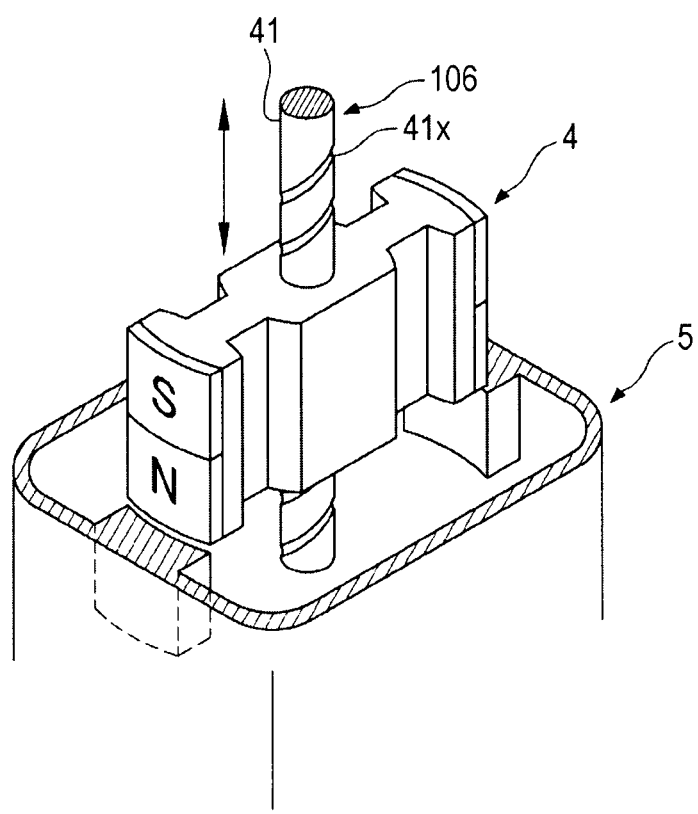
FIG. 15 is a diagram illustrating another modification of FIGS. 11 and 12.

Alternatively, as in an oil-supplying mechanism 106 illustrated in FIG. 15, the shaft 41 of the stator 4 may have a spiral groove 41x in the surface thereof facing the bearing surfaces of the sliding bearings 48 illustrated in FIG. 11 (if collars or the like are provided, in the outer circumferential surfaces of the collars).

That is, even if the mover 5 is supported in such a manner as to be slidable along the outer perimeter of the shaft 41 with the sliding bearings 48 interposed therebetween as illustrated in FIG. 11 and the mover 5 only reciprocates together with the sliding bearings 48 but without undergoing twisted movement, oil spreading into the groove 41x is spirally supplied into the bearing gaps, inclusive of the narrowed portions, between the shaft 41 and the sliding bearings 48 in conjunction with the reciprocation of the mover 5. Therefore, lubrication performance over the entirety of the sliding bearings 48 is effectively improved. Such a spiral groove may alternatively be provided in each of the sliding bearings 48.

Of course, the oil-supplying mechanism as a liquid-supplying mechanism may have any configuration other than those described above.

Furthermore, in a case where the linear actuator 1x to be manufactured employs sliding bearings as movable supporting portions as described above, the manufacturing method according to the present invention may be applied, whereby the same operational effects as those in the above embodiments are produced.

While the above embodiments employ a so-called outer-type configuration in which a mover positioned on the outer side of a stator is moved, an inner-type configuration in which a mover positioned on the inner side of a stator is moved may alternatively be employed. This also applies in the first embodiment.

Furthermore, if fins are added to the surface of the casing in each of the above embodiments, the cooling efficiency is further increased.

Fourth Embodiment

In the bubble-removing step X disclosed in the first embodiment, there has been disclosed the inner-wall discharging step X11 included in the during-filling deaerating step X1 and in which the oil L is caused to run down from above the casing 3 along the sidewall 6a of the casing body 6. In the present embodiment, a mode in which the oil L is supplied while further preventing taking in of air into the oil L in the filling step S2 will be described.

Herein, a bottom-wall filling step X13 in which oil is supplied from the bottom of the casing 3 as illustrated in FIG. 16 will be described as an exemplary step included in the during-filling deaerating step X1. Specifically, an oil injection port 6c is provided in a bottom wall 6b of the casing body 6, and a discharge nozzle Z1 is connected to the oil injection port 6c. In the bottom-wall filling step S13 according to the present embodiment, for example, oil L stored in a tank T2 is discharged from a bottom T21 of the tank T2 through the bottom wall 6b of the casing 3 into the casing 3 with the power of a pump W3, whereby the oil L is supplied by gradually raising an oil surface L3, not by dropping the oil L into the casing 3. Furthermore, the during-transfer deaerating step X11 may also be incorporated, of course, by providing a non-illustrated deaerating filter EF, the same as that in the above embodiments, on a path extending from the tank T2 to the casing 3.

By applying such a step, the oil L is supplied with a gentle flow without being dropped into the casing 3. Therefore, the formation of bubbles F due to taking in of ambient air is further suppressed. Needless to say, in this case also, it is effective to also incorporate vibratory deaeration or vacuum deaeration after the filling step.

While the above embodiments disclose a mode in which the linear actuator unit 1U is shook by giving vibration thereto as the shaking step, a mode in which the casing is shook horizontally and vertically or a mode in which the casing is turned over or rotated may alternatively be employed, of course.

The specific configurations of individual elements, the specific methods of the bubble-removing step, and so forth are not limited to those described in the above embodiments, of course, and various modifications can be made thereto without departing from the scope of the present invention.

Other possible bubble-removing steps include a step in which oil is heated before the filling step, a step in which oil is supplied while the casing is heated, a step in which the casing is heated after the filling step, and so forth. Thus, any bubbles contained in the oil expand. Therefore, a state where deaeration can be more easily performed is created. In addition, when oil is supplied, a step in which the oil is deaerated by vacuum may be performed in the bubble-removing step, and the oil may be subsequently supplied into the casing.

Furthermore, any liquid or fluid other than oil may be employed as liquid material. The specific configurations of individual elements are not limited to those described in the above embodiments, and various modifications can be made thereto without departing from the scope of the present invention.

The linear actuator according to the present invention is suitably, but is not limited to be, applicable to a vibration-damping device, and is also widely applicable to other devices such as a vibration-applying device. The method of manufacturing a linear actuator unit according to the present invention is also suitably, but is not limited to be, applicable to a linear actuator unit included in a vibration-damping device, and is widely applicable to linear actuator units included in other devices such as a vibration-applying device.

INDUSTRIAL APPLICABILITY

According to the present invention described in detail above, since problems such as reductions in the rated thrust and instantaneous maximum thrust of a linear actuator itself are effectively avoided by improving its heat-releasing characteristic, a linear actuator having desired rated thrust and instantaneous maximum thrust is provided even if the size of the linear actuator body is reduced.

What is claimed is:

1. A linear actuator comprising:
   a linear actuator body including a stator having a leaf spring that supports a mover so as to be reciprocatable, the mover being reciprocatable in a specific direction relative to the stator and a coil that causes the mover to reciprocate;
   a casing substantially enclosing the linear actuator body with a part of the linear actuator body secured thereto; and
   a liquid that fills an internal space of the casing with the coil and the leaf spring of the linear actuator body submerged in the liquid, the liquid being lubricating and electrically insulating,
   wherein the liquid is deaerated prior to or after the internal space is filled with the liquid.

2. The linear actuator according to claim 1, wherein a part of the stator is secured to the casing, a part of the casing is secured to an object which is subject to a vibration control, whereby a reaction force produced by reciprocating the mover is transmitted to the object through the stator and the casing.

3. The linear actuator according to claim 1, wherein bubbles are not present between the linear actuator body and the liquid.

4. The linear actuator according to claim 1, further comprising:
a gas-permeable material provided on the casing such that a gas in the internal space of the casing can permeate to outside of the casing.

5. A method of manufacturing a linear actuator, the method comprising:
a step of housing a linear actuator body in a casing, the linear actuator body including a stator having a movable supporting portion that supports a mover so as to be reciprocatable, the mover being reciprocatable in a direction relative to the stator, a coil that causes the mover to reciprocate, and a casing substantially enclosing the linear actuator body with a part of the linear actuator body secured thereto;
a step of filling an internal space of the casing with a liquid that is lubricating and electrically insulating, with the coil and the movable supporting portion being submerged in the liquid; and
a step of preventing formation of bubbles between the movable supporting portion and the liquid,
wherein the step of preventing formation of bubbles between the movable supporting portion and the liquid comprises a step of deaerating the liquid before the completion of the step of filling.

6. The method according to claim 5, wherein the step of preventing formation of bubbles between the movable supporting portion and the liquid comprises a step of removing the bubbles, formed between the liquid having been supplied in the step of filling, and the linear actuator body.

7. The method according to claim 6, wherein the step of preventing formation of bubbles between the movable supporting portion and the liquid further comprises a step of causing the mover to reciprocate.

8. The method according to claim 7, wherein the step of preventing formation of bubbles between the movable supporting portion and the liquid further comprises a step of vibrating the casing and the liquid therein.

9. The method according to claim 8, wherein the casing is vibrated with a frequency higher than that of reciprocation of the mover.

10. The method according to claim 6, wherein the linear actuator includes a gas-permeable material provided on the casing such that a gas in the internal space of the casing can permeate to outside of the casing, and wherein the step of preventing formation of bubbles between the movable supporting portion and the liquid further includes a step of deaerating the liquid through the gas-permeable material.

11. The linear actuator according to claim 1, wherein bubbles are not present between the leaf spring and the liquid.

12. The linear actuator according to claim 1, wherein the liquid is deaerated prior to the internal space being filled with the liquid.

13. The linear actuator according to claim 12, wherein the liquid is supplied to the casing to allow the liquid to run along an inner wall of the casing.

14. The linear actuator according to claim 12, wherein liquid fills 80% to 95% of the internal space.

15. The linear actuator according to claim 1, wherein the liquid is deaerated after the internal space is filled with the liquid.

16. The linear actuator according to claim 15, wherein the liquid is deaerated by shaking the casing.

17. The linear actuator according to claim 16, wherein the liquid fills 80% to 95% of the internal space.

* * * * *